United States Patent
Okuno et al.

(10) Patent No.: US 6,873,736 B2
(45) Date of Patent: *Mar. 29, 2005

(54) METHOD FOR SUPPLEMENTING DIGITAL IMAGE WITH PICTURE ELEMENT, AND DIGITAL IMAGE ENCODER AND DECODER USING THE SAME

(75) Inventors: Maki Okuno, Himeji (JP); Choong Seng Boon, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 507 days.

This patent is subject to a terminal disclaimer.

(21) Appl. No.: 09/826,454

(22) Filed: Apr. 5, 2001

(65) Prior Publication Data

US 2001/0033695 A1 Oct. 25, 2001

Related U.S. Application Data

(63) Continuation of application No. 09/117,349, filed as application No. PCT/JP97/00117 on Jan. 21, 1997, now Pat. No. 6,577,771.

(30) Foreign Application Priority Data

| | | | |
|---|---|---|---|
| Jan. 29, 1996 | (JP) | ............................................. | 8-012545 |
| Jun. 20, 1996 | (JP) | ............................................. | 8-159352 |
| Jul. 29, 1996 | (JP) | ............................................. | 8-198721 |

(51) Int. Cl.⁷ .............................................. G06K 9/36
(52) U.S. Cl. ...................... 382/233; 382/232; 382/242; 382/243
(58) Field of Search ................................ 382/232, 233, 382/242, 243, 236; 348/413.1; 375/240.1; 345/505, 550; 714/763

(56) References Cited

U.S. PATENT DOCUMENTS

4,951,140 A    8/1990    Ueno et al. ............... 348/413.1

FOREIGN PATENT DOCUMENTS

| EP | 0 719 049 | 6/1996 | ............ H04N/7/24 |
|---|---|---|---|
| JP | 1-198884 | 8/1989 | .......... H04N/7/137 |
| JP | 3-268679 | 11/1991 | .......... H04N/1/141 |
| JP | 6-30397 | 2/1994 | .......... H04N/7/137 |
| JP | 6-351001 | 12/1994 | .......... H04N/7/137 |
| JP | 8-307871 | 11/1996 | ............ H04N/7/32 |

OTHER PUBLICATIONS

Desai, "DCT and Wavelet Based Representations of Arbitraily Shaped Image Segments", Proceedings of the Internat'l Conference on Image Processing, Oct. 23–26, 1995, IEEE Comp. Soc. Press. vol. 3, 10/95 pp. 558–561.

(Continued)

*Primary Examiner*—Anh Hong Do
(74) *Attorney, Agent, or Firm*—RatnerPrestia

(57) ABSTRACT

The present invention provides a method of supplementing a digital picture with a shorter delay time and less calculations. The padding method is applied to a picture having a great motion, and results in producing a prediction signal with small errors. The present invention also provides an apparatus using the same method. To be more specific about the method, in a digital picture data including picture information indicating an object, a picture is resolved into a plurality of regions adjoining with each other, and each of the insignificant sample value of a region containing the boundary of the object shape is supplemented (padded) by the values obtained from transforming of the significant pixels near to the insignificant pixels.

7 Claims, 31 Drawing Sheets

European Search Report for EP 01109472, dated Jan. 28, 2002 (Communication ref.: BB 45118C).

European Search Report for EP 01109472, dated Jan. 28, 2002 (Communication Ref.: BB 45118 B).

Japanese language search report for Int'l Appln. No. PCT/JP97/00117 dated Apr. 30, 1997.

English translation of Japanese language search report.

"Munich Meeting of MPEG–4 Working Group Report ISO/IEC JTC1/SC29/WG11 MPEG4/N1172".

S. F Chang et al., "Transform Coding Of Arbitrarily–Shaped Image Segments", Aug. 2, 1993, pp. 83–90.

Yanbin Yu et al., "Pictorial Transform Coding For Tessellating Arbitrary Shaped Regions", Sep. 18, 1990.

European Search Report dated Jan. 19, 2001, application No. EP97900471.

METHOD FOR SUPPLEMENTING DIGITAL IMAGE WITH PICTURE ELEMENT, AND DIGITAL IMAGE ENCODER AND DECODER USING THE SAME

THIS APPLICATION IS A U.S. NATIONAL PHASE APPLICATION OF PCT INTERNATIONAL APPLICATION PCT/JP97/00117 filed Jan. 21, 1997, which is a Continuation of Ser. No. 09/117,349, filed Jul. 29, 1998, now U.S. Pat. No. 6,577,771.

FIELD OF THE INVENTION

The present invention relates to a method of padding a digital picture having an arbitrary shape, and an encoder and a decoder of digital picture using the same method.

BACKGROUND ART

It is necessary to compress (encode) a digital picture for promoting the efficiency of its storage and transmission. Several methods of encoding are available as prior arts such as "discrete cosine transform" (DCT) including JPEG and MPEG, and other wave-form encoding methods such as "subband", "wavelet", "fractal" and the like. Further, in order to remove a redundant signal between pictures, a prediction method between pictures is employed, and then the differential signal is encoded by wave-form encoding method.

According to the recent trend, the object constituting a picture are individually encoded and transmitted, for improving the coding efficiency as well as allowing reproduction of the individual objects which constitute a picture. On a reproducing side, each object is decoded, and the reproduced objects are composited into the picture for displaying. Per-object base encoding method allows the user to combine objects arbitrarily, whereby a motion picture can be re-edited with ease. Further, depending on the congestion of the communication channel, performance of a reproducing apparatus or a user's taste, even a less important object is saved from being reproduced, a motion picture can be still identified.

In order to encode a picture having an arbitrary shape (i.e., an object), an appropriate transformation method adapted to the shape is employed, such as the "shape adaptive discrete cosine transform", or an insignificant region of the picture is padded by a predetermined method and then a conventional cosine transform (8×8) is provided, where the insignificant region is an outside of the display region of the object, and contains no pixel data for displaying an object, in other words, the region consists of insignificant sample values only. On the other hand, insignificant sample values can be found at the object boundary of a prediction region (e.g., a block consisting of 16×16 pixels) which is obtained through a motion compensation of a reference picture reproduced in the past for removing a redundant signal between pictures. This type of prediction region is firstly padded, then a the difference between the subject region and the predict region is obtained, and then, transformed and encoded. The reason why the prediction region is padded is to suppress a differential signal.

When the efficiency of encoding/decoding a digital picture is considered, how to pad the insignificant pixels is an important subject, and this influences a decoded picture quality and transmitting data quantity.

The prior art discussed above discloses the following steps: An overall picture is referenced and padded first, to prevent a prediction region from including insignificant sample values, then the prediction region is obtained by a motion compensation or other methods. How to pad the overall picture is, repeating a significant sample value on an object boundary and replacing an insignificant sample values therewith. When a sample is padded by scanning both horizontal and vertical directions, an average of both the padded values are taken. This conventional method pads the whole picture, and therefore providing a prediction region with less errors for a picture having a great motion.

However, when the whole image of a reproduced reference picture is referenced and padded, the reference picture must be entirely decoded, before padding can be started. When repetitive padding is applied, the amount of calculation increases in proportion to the picture size. In other words, this padding method requires a large amount of processing and a long delay time, and sometimes results in very large amount of calculation, for reproducing a picture.

In order to avoid calculation proportional to the picture size, a reproduced boundary region should be padded on per-region basis. This method can solve the delay time and volumes of calculation. However, since this method pads only the boundary region, the significant regions are limited within the internal region bounded by the boundary regions, and hence limiting the effect of padding. Therefore, this method cannot produce a prediction signal having less errors for a motion picture with a great motion.

Since the method of padding the overall picture results in increasing data amount, only a small advantage can be expected. In other words, an insignificant pixel has no pixel values to be encoded, and when significant pixels are encoded together with an insignificant pixel, coding efficiency is lowered. For example, when the significant pixels are all in black, the coding efficiency is lowered if insignificant pixels are in white, on the other hand, the coding efficiency is promoted if the insignificant pixels are in black. As such, a value of the insignificant pixel does not influence a quality of a reproduced picture, but influences the coding efficiency, therefore, how to deal with the insignificant pixel value should have been discussed with care.

DISCLOSURE OF THE INVENTION

The present invention aims to, firstly, provide a padding method, through which a prediction signal with less errors can be produced for a motion picture having a great motion, accompanying a short delay time and a small volume of calculation.

In order to achieve the above goal, according to the present invention, in a digital picture data including picture information which indicates an object, a picture is resolved into a plurality of regions adjoining with each other, and insignificant sample value of a region containing the boundary of the object shape is padded by the values obtained from transforming the significant pixel values near to the insignificant pixel values.

The simplest functional transformation is that an insignificant pixel value is replaced with a significant pixel value adjoining thereto, and this replacement is just repeated. The combination of this repetitive replacement method and the above method can produce the more effective padding.

Further, there is a method of enlarging a padding region to an appropriate extent. This method extends the region to be padded to an insignificant regions consisting of insignificant pixel values only, where the insignificant regions are near to the regions containing an object boundary. In addition to padding these insignificant regions, this method also pads the regions containing the object boundary using values obtained by applying a functional transformation to the significant pixel values of the region. This method enables processing involving larger motion compensation.

The present invention aims to, secondly, apply the above method of padding a digital picture to the methods of encoding/decoding digital picture and the apparatus thereof, whereby a picture compression process producing the better picture quality with a small amount of processing data can be realized.

In order to achieve the above goal, a picture encoder comprising the following elements is prepared: In a digital picture data including picture information which indicates an object of the input signal, where the input signal comprises (1) a signal indicating a pixel value and (2) a significant signal indicating whether a pixel value of each pixel is significant or not, the picture encoder comprises, (a) predicted picture generation means for producing a predicted picture signal corresponding to the input signal by using a decoded picture signal, (b) pixel value generation means for resolving the picture into a plurality of regions adjoining to each other, padding the insignificant sample value of the region containing a boundary of the object shape with a functional-transformed significant pixel values located near to the above insignificant pixel value, (c) subtraction means for subtracting the output of the predicted picture generation means from an output of the pixel value generation means, (d) encoding means for encoding the output of the subtraction means, (e) decoding means for decoding the output of the encoding means, (f) adding means for adding an output of the decoding means and the output of the predicted picture generation means, and (g) memory means for storing the output of the adding means temporarily for further use in the predicted picture generation means, wherein the output of the encoding means is an output of this picture encoder.

The corresponding digital picture decoder comprising the following elements is also prepared:

(a') decoding means for decoding the input signal, (b') predicted picture generation means for producing a predicted picture signal corresponding to the input signal by using a decoded picture signal, (c') pixel value generation means for producing a pixel value from significant pixel value in the predicted picture signal by using a predetermined function, replacing insignificant pixel value of the predicted picture signal with the produced picture value, and outputting the replaced pixel value, (d') adding means for adding an output of the decoding means and an output of the pixel value generation means, and (e') memory means for storing temporarily an output of the adding means for further use in the predicted picture generation means, wherein the output of the decoding means is an output of this picture decoder.

An insignificant region adjoining to the boundary of object shape and consisting of insignificant sample values only, is padded, whereby processing region is appropriately enlarged without increasing data volume remarkably, and as a result, the accuracy of processes including a motion compensation is promoted.

To be more specific about the padding method of a digital picture according to the present invention, the method comprising the following steps is prepared:

a first padding process for scanning a picture sample having an arbitrary shape consisting of significant and insignificant sample values along a first direction, and in the first direction, producing a first padded picture by replacing the insignificant sample values with the significant sample values selected through a predetermined method, a second padding process for scanning each sample of the first padded picture consisting of significant and insignificant sample values along a second direction, and in the second direction, replacing the insignificant sample values of the first padded picture with the significant sample values selected through a predetermined method or the sample values padded in the first padding process.

To be more specific about the padding method of a digital picture according to the present invention, another method comprising the following steps is prepared:

resolving a digital picture having an arbitrary shape into a plurality of regions, processing the regions according to a predetermined order, padding the insignificant region adjoining to a boundary region at the shape boundary and consisting of insignificant sample values only, with a predetermined padding values.

When the subject region is not an insignificant region, in particular, if a previous region adjoining to a subject region is an insignificant region at the predetermined order, the previous region is padded with a padding value found through a predetermined method.

When the subject region is an insignificant region, in particular, if a previous region adjoining to a subject region is not an insignificant region at the predetermined order, the subject region is padded with a padding value found through a predetermined method.

A picture encoder employing the method of padding a digital picture according to the present invention comprises the following elements:

input means for receiving a digital picture data having an arbitrary shape, process means for resolving the digital picture into a plurality of regions adjoining to each other, a first adding device for receiving a data of a subject region and a data of a prediction region, and producing a data of a differential region, an encoding device for receiving the data of the differential region, and compressing thereof into a data of a compressed differential region through a predetermined method, a decoding device for receiving the data of the compresssed differential region, and decoding thereof into a data of an expanded differential region, a second adding device for receiving the data of the expanded differential region, adding the data of the prediction region thereto, and producing a data of a reproduced region, a first padding device for receiving the data of the reproduced region and padding the insignificant sample values included in the reproduced region through the previously described padding method, a frame memory for storing the data of the reproduced region of which insignificant sample value has been padded.

Instead of or in addition to the first padding device, a second padding device is employed for padding insignificant sample values included in the prediction region.

A picture decoder employing the method of padding a digital picture according to the present invention comprises the following elements:

input means for receiving a compressed coded data, a data analyzing device for analyzing the compressed coded data, and outputting a compressed differential signal, a decoding device for decoding the compressed differential signal into an expanded differential signal, an adding device for adding the expanded differential signal and a prediction signal, producing a reproduced signal and outputting thereof, a first padding device for padding an insignificant sample values included in the reproduced signal through the previously described method, a frame memory for storing a picture data padded by the first padding device as the prediction signal.

Instead of or in addition to the first padding device, a second padding device is employed for padding insignificant sample values included in the prediction region.

DETAILED DESCRIPTION OF THE PREFERRED EMBODIMENTS

The present invention is detailed hereinafter by referring to exemplary embodiments.

(Exemplary Embodiment 1)

Figure 1:
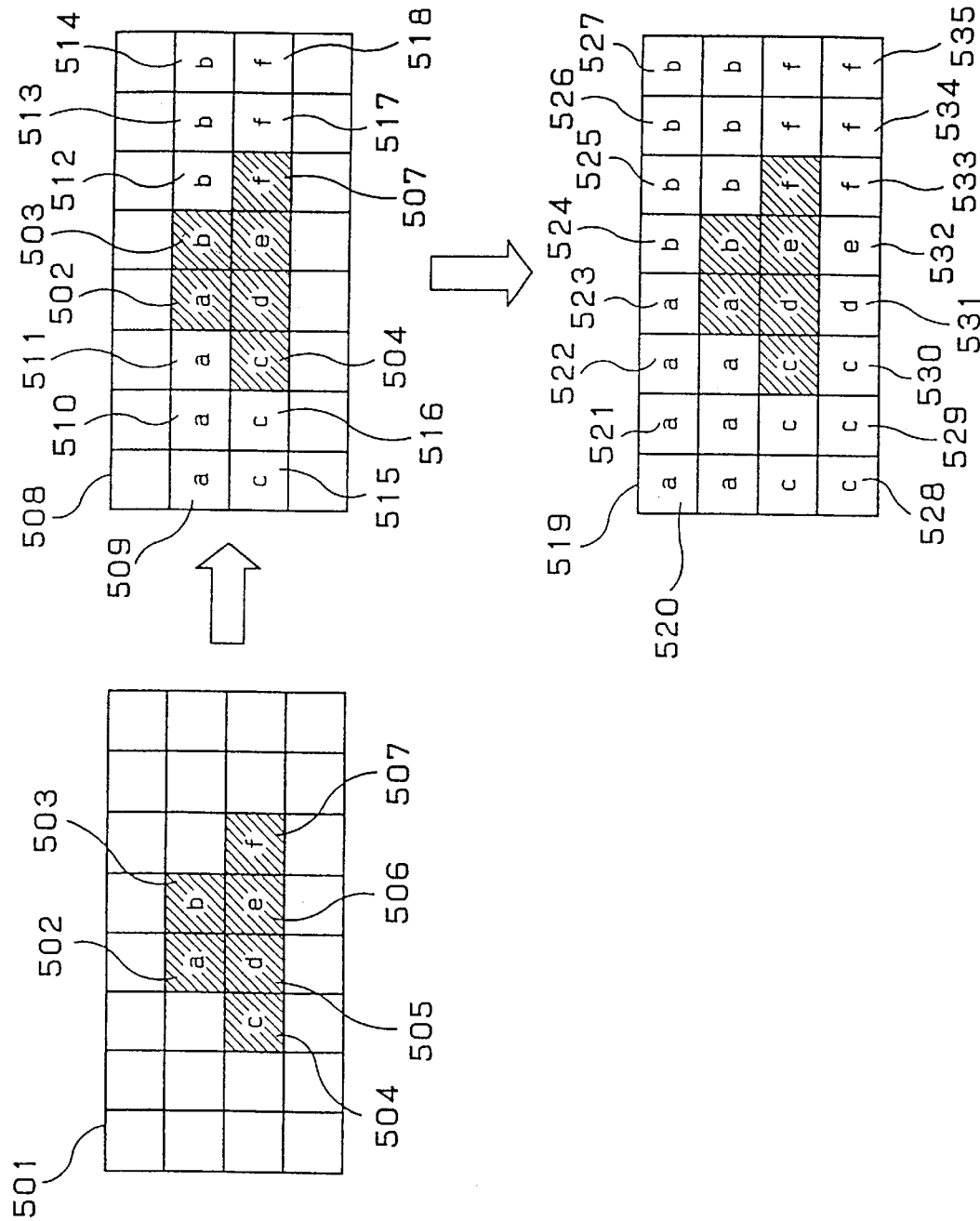
FIG. 1 is a schematic diagram depicting a padding method of a digital picture in a first exemplary embodiment of the present invention.

FIG. 1 is a schematic diagram depicting a padding method of a digital picture in a first exemplary embodiment of the present invention. A picture 501 is a subject picture to be padded. Each lattice in the picture 501 represents a pixel i.e., a sample from the picture. Pixels 502–507 are significant samples, and other samples are insignificant.

In this embodiment, a shape signal of the picture is referred to for determining whether a sample is significant or insignificant. When the shape signal is "0", the sample is insignificant, and when the shape signal is "1", the sample is significant.

When a picture 508 is produced from the picture 501, each insignificant sample is padded as described below:

First, scan each line of the picture 501. In this scanning process, when a significant sample is detected, a value thereof is substituted to an insignificant sample, e.g., when the first line is scanned, padding process is not done because of no significant sample, and when the second line is scanned, samples 509, 510 and 511 are insignificant, while a sample 502 is significant, thus the insignificant samples are padded with a value "a" of the sample 502. In other words, the value of sample 502 is repeatedly padded to the adjoining insignificant samples 511, 510 and 509 sequentially. In the same manner, a value "b" of sample 503 is repeatedly padded to samples 512, 513 and 514.

The third line is padded as same as the second line, and the fourth line is not padded because of no significant sample. In the picture 508 thus padded, the second and third lines have significant values.

Next, based on the picture 508, the remaining insignificant samples are padded. As shown in picture 519, scan the picture in vertical direction, and pad insignificant samples 520 and 528 respectively with the samples 509 and 515 which have been padded in the picture 508. As such, samples 521–527 and 529–535 are padded in the same manner.

Through the above steps, the insignificant samples can be padded in a simple manner while the continuity between the samples is maintained, and therefore, improves the calculation efficiency including compression of pictures, while a picture quality is maintained.

In this embodiment, padding is performed through scanning along the horizontal and vertical directions which are perpendicular to each other; however, the scanning along a slanted line produces also the same effect. Further, a method of vertical scanning first, followed by horizontal scanning also produces the same effect. As long as the continuity of the samples is maintained, methods other than padding an insignificant sample with the nearest significant sample are applicable.

Figure 2:
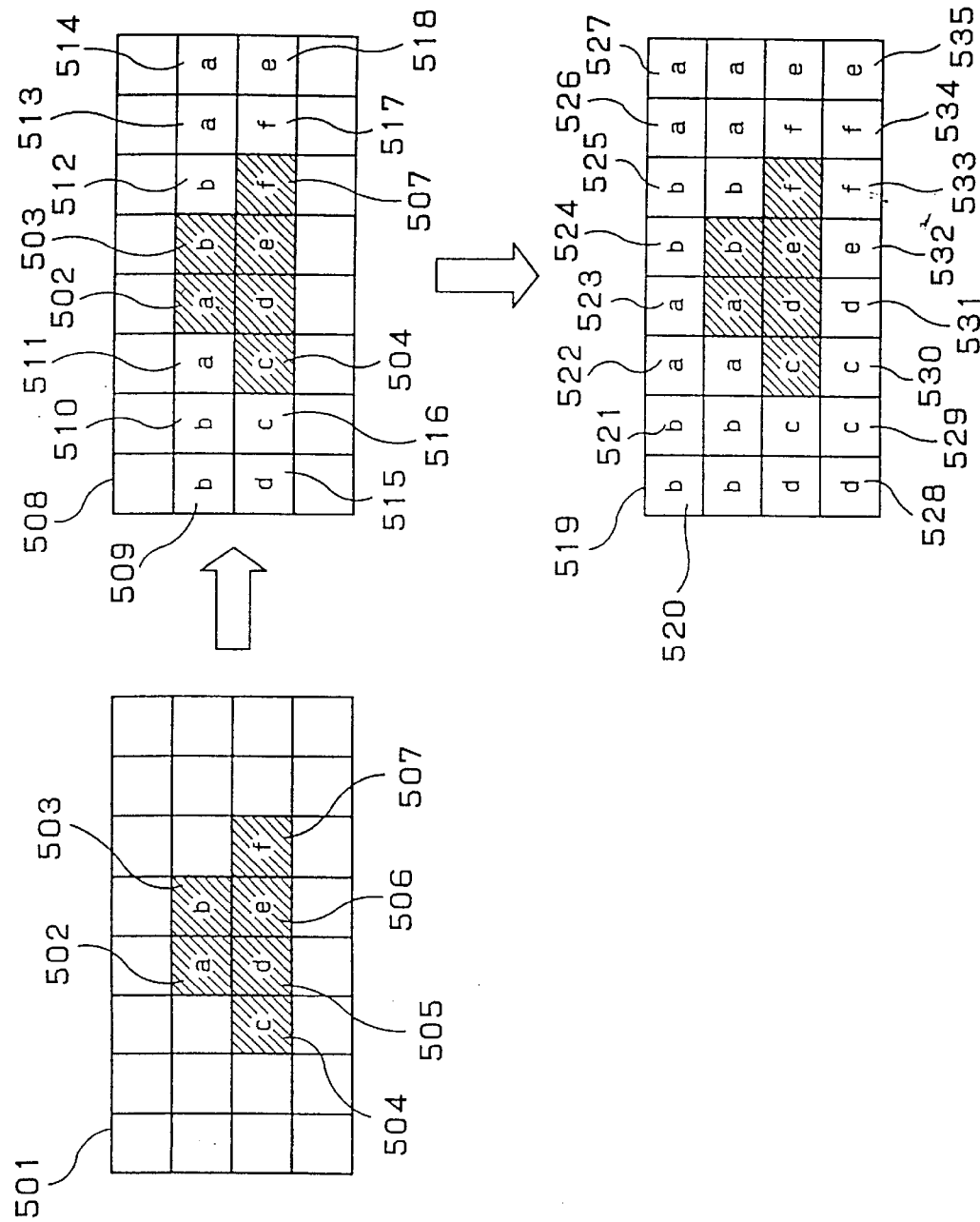
FIG. 2 is a schematic diagram depicting a first modification of the padding method of the digital picture in the first exemplary embodiment of the present invention.

FIG. 2 is a schematic diagram depicting a first modification of the padding method of the digital picture in the first exemplary embodiment of the present invention. In the picture 508, when a horizontal scanning is performed, mirroring can be done with respect to the boundary as a center between the insignificant and significant samples. For example, samples 511 and 502 are the boundary in a mirror, and a value of sample 502 is substituted into a value of sample 511, then a value of sample 503 is substitute into a sample 510. As such, the picture 501 is sequentially padded along the arrow mark, to the picture 508, and then to the picture 519, until all insignificant samples are padded.

Figure 3:
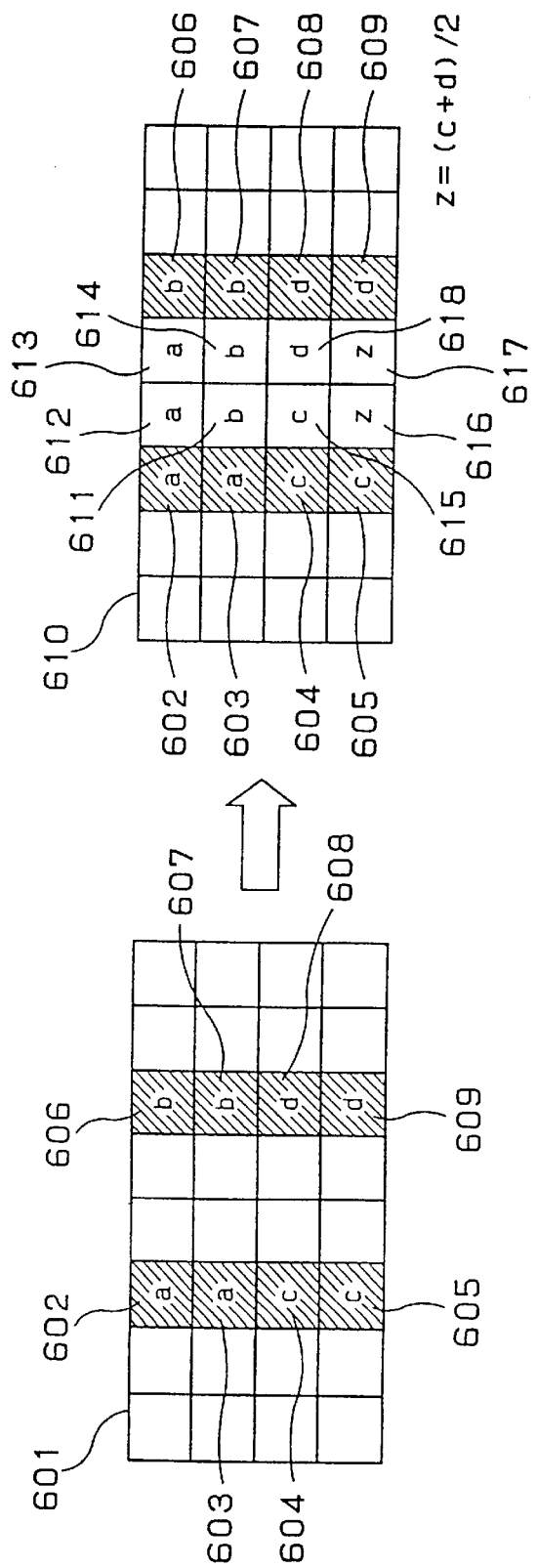
FIG. 3 is a schematic diagram depicting a second modification of the padding method of the digital picture in the first exemplary embodiment of the present invention.

FIG. 3 is a schematic diagram depicting a second modification of the padding method of the digital picture in the first exemplary embodiment of the present invention. This method is applied when an insignificant sample is located between significant samples. A case of horizontal scanning is detailed here, however, the details can be applied in the case of scanning other directions: Samples 612 and 613 are padded with a value of a sample 602. Another method is that samples 611 and 614 can be padded with a value of sample 607. The first method is that samples are scanned from left to right by extending a significant sample as it is for padding. The second method is that samples are scanned from right to left by extending the significant sample as it is for padding. The third method is that an insignificant sample is padded with its nearest sample along the scanning direction. Samples 615 and 618 are padded by this method. Lastly, an insignificant sample is padded with an average value of significant samples on both sides of the insignificant sample. Samples 616 and 617 are padded by this method.

Figure 4:
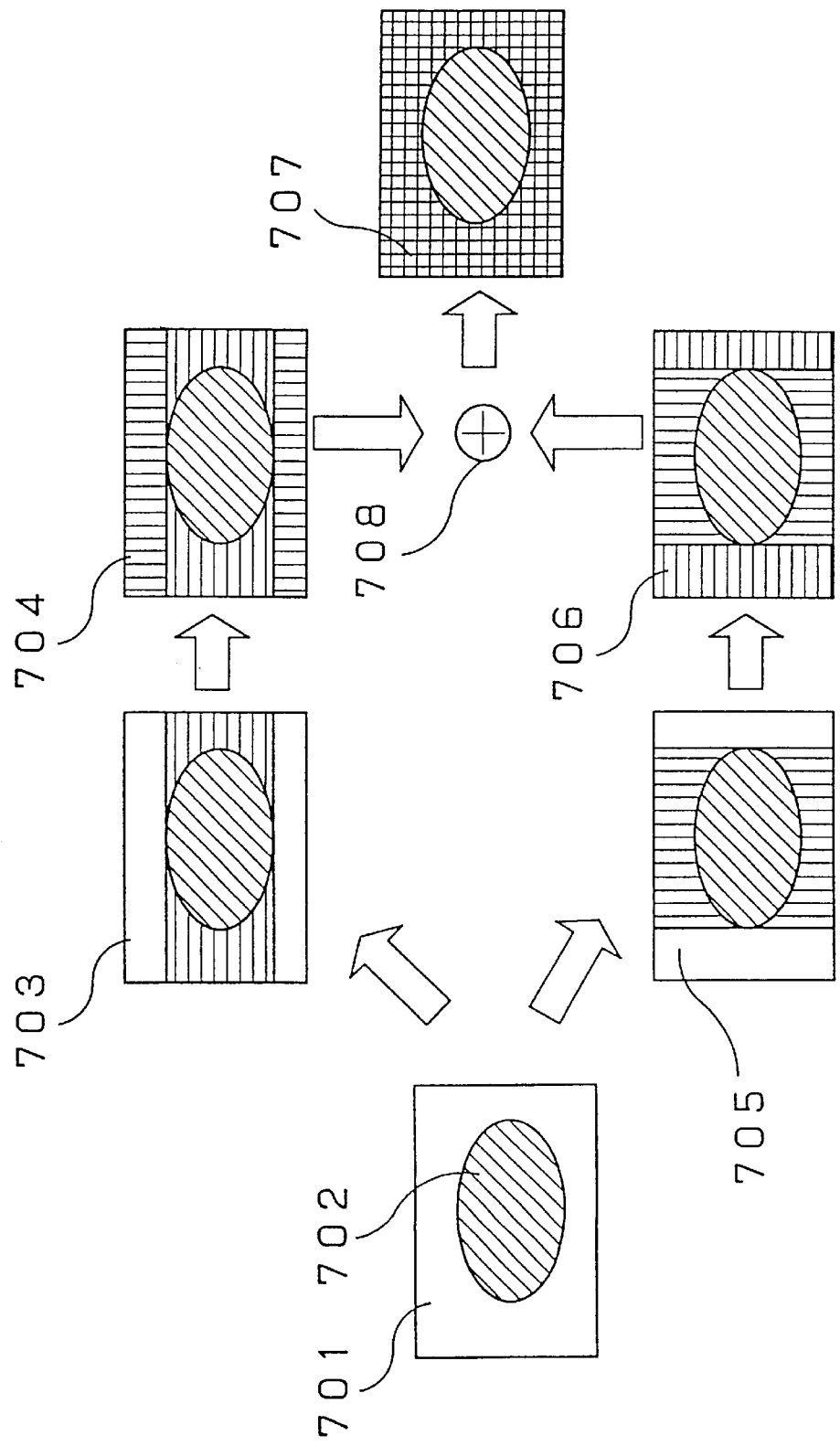
FIG. 4 is a schematic diagram depicting a third modification of the padding method of the digital picture in the first exemplary embodiment of the present invention.

FIG. 4 is a schematic diagram depicting a third modification of the padding method of the digital picture in the first exemplary embodiment of the present invention. When a picture indicates an oval object, i.e., significant samples gather so that they shape into an oval, and this picture is basically padded by the method used in FIG. 1.

A picture 701 comprises collected significant samples 702. First, as shown in a picture 703, insignificant samples are padded by horizontal scanning, next, as shown in a picture 704, insignificant samples are padded by using significant samples or the samples padded in the picture 703 through vertical scanning. On the other hand, as shown in a picture 705, insignificant samples are padded by vertical scanning first, and then by horizontal scanning. An average of the pictures 704 and 706 thus padded is taken, whereby a picture 707 is produced. This padding method can maintain sequence between the significant samples and the padded samples even in a more complex picture, and thus can deal with calculations efficiently while maintaining a picture quality.

(Exemplary Embodiment 2)

Figure 5:
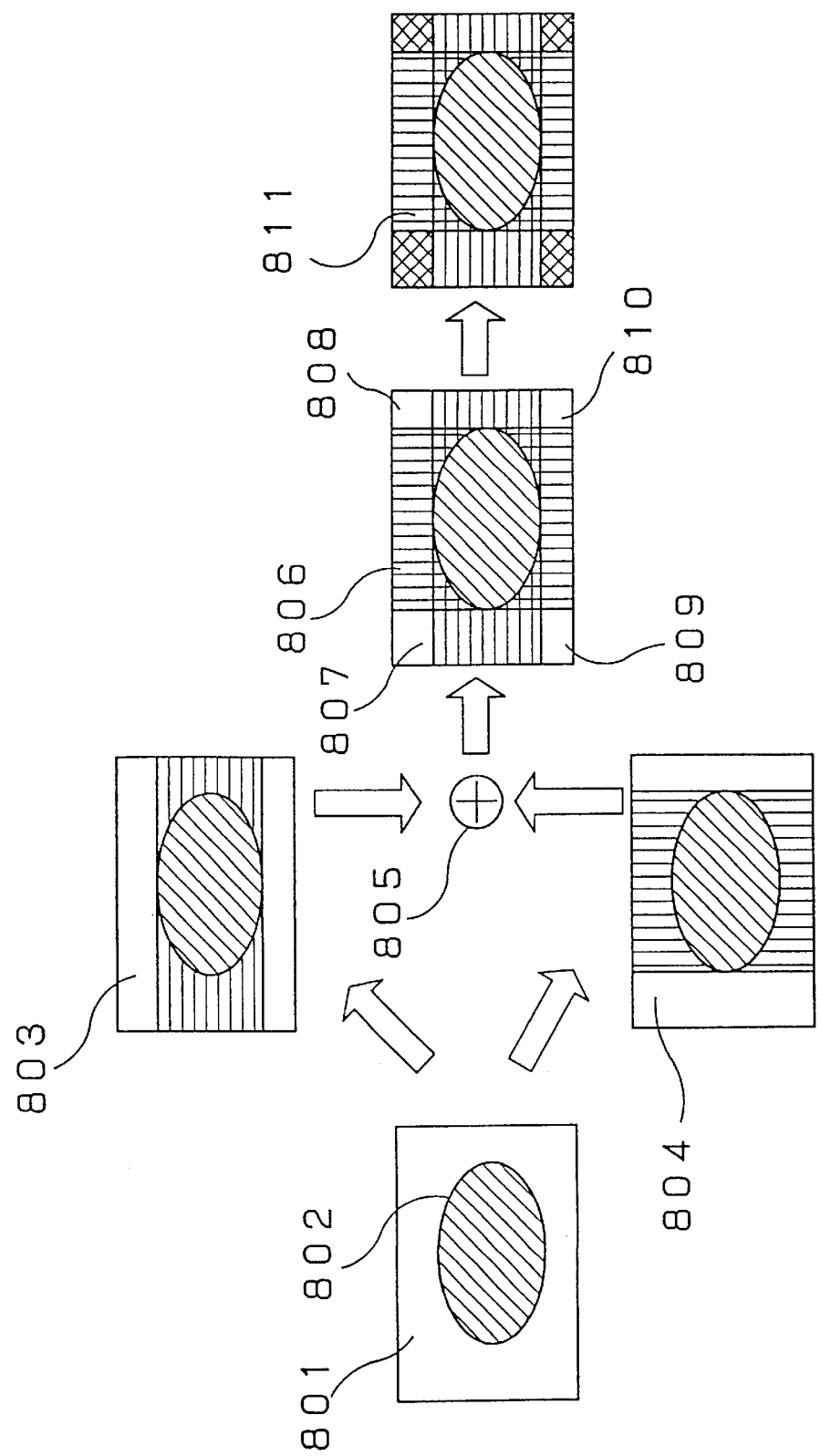
FIG. 5 is a schematic diagram depicting a padding method of a digital picture in a second exemplary embodiment of the present invention.

FIG. 5 is a schematic diagram depicting a padding method of a digital picture in a second exemplary embodiment of the present invention.

A picture 801 comprises collected significant samples 802. First, scan the picture 801 horizontally, and substitute significant sample values into the nearest insignificant samples to produce a picture 803. At the same time, scan the picture 801 vertically, and substitute significant samples into the nearest insignificant samples to produce a picture 804.

An average of the pictures 803 and 804 is taken to produce a picture 806. An average of the collected significant samples 802 would result in the same value, thus the averaging is not needed.

Since there are some samples values double padded in the picture 803 and 804, an average of both the padded values is taken. If there is only one padded value available, this value becomes the padded value of the picture 806. In the padding process of the pictures 803 and 804, a sample having no padding value remains as an insignificant sample as it is. This insignificant sample is then to be padded with a value of the nearest significant sample or padded sample. When more than one padding values are available, an average of these values, or one of them is used for padding. All samples are finally padded as shown in a picture 811.

This embodiment shows an another padding method to maintain continuity between the collected significant samples and insignificant samples both forming a complex shape, like the exemplary embodiment 1.

(Exemplary Embodiment 3)

Figure 6:
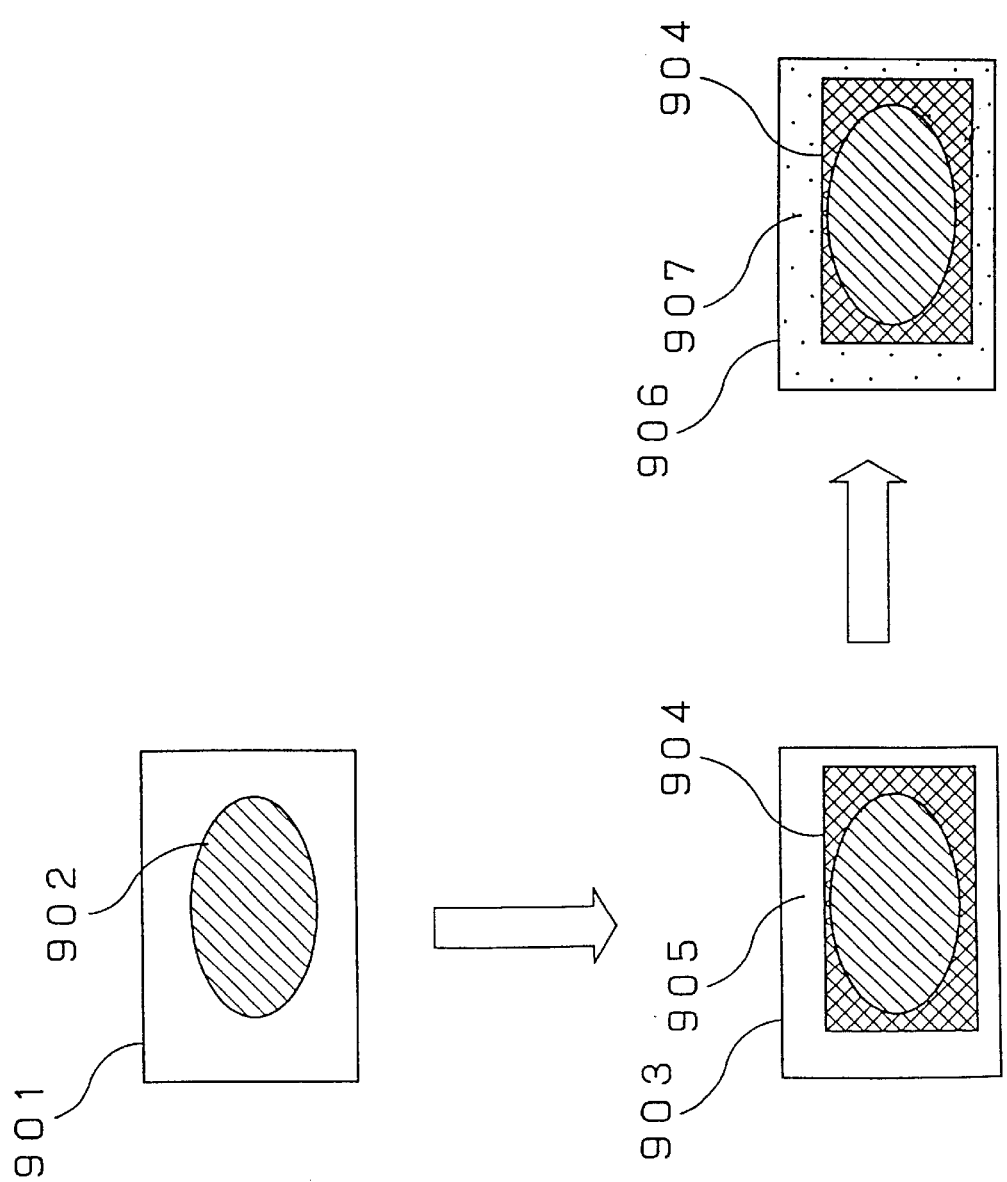
FIG. 6 is a schematic diagram depicting a padding method of a digital picture in a third exemplary embodiment of the present invention.

FIG. 6 is a schematic diagram depicting a padding method of a digital picture in a third exemplary embodiment of the present invention.

A picture 901 comprises collected significant samples 902. In this embodiment, a region 904 surrounding the collected significant samples 902 is determined and an insignificant sample is padded within the region 904. The same padding method detailed above is utilized also in this embodiment. A remaining region 905 is padded through a simple method by referring to the padded region 904, thus all insignificant samples are padded (Ref. to FIG. 906.)

The region 904 is preferably rectangular; however, it may be another shape. The region 904 may be the smallest rectangular which includes the collected significant samples 902, or a rectangular after extending the smallest rectangular by "k" samples. The value "k" is determined so that a size of the rectangular can satisfy a predetermined condition, e.g., "k" is determined so that the size of the rectangular can be a multiple of 16.

Figure 7:
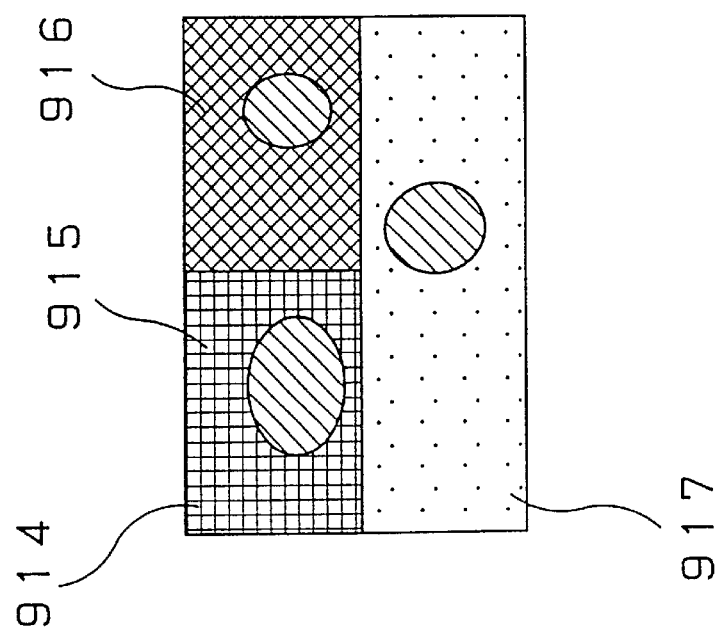
FIG. 7 is a schematic diagram depicting a first modification of the padding method of the digital picture in the third exemplary embodiment of the present invention.
Figure 7:
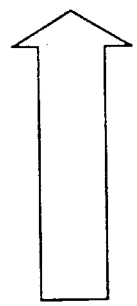
Figure 7:
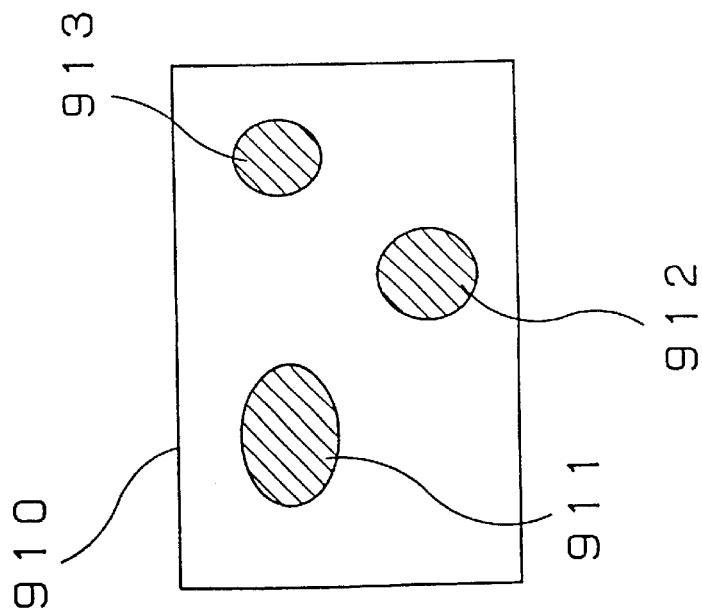

FIG. 7 is a schematic diagram depicting one modification of the padding method of the digital picture in the third exemplary embodiment of the present invention, and a picture 910 comprises collected significant samples 911, 912 and 913. The picture 910 is resolved into respective regions 915, 916 and 917 which include the above collected significant samples, and then the respective regions are padded through the method previously described.

(Exemplary Embodiment 4)

Figure 8:
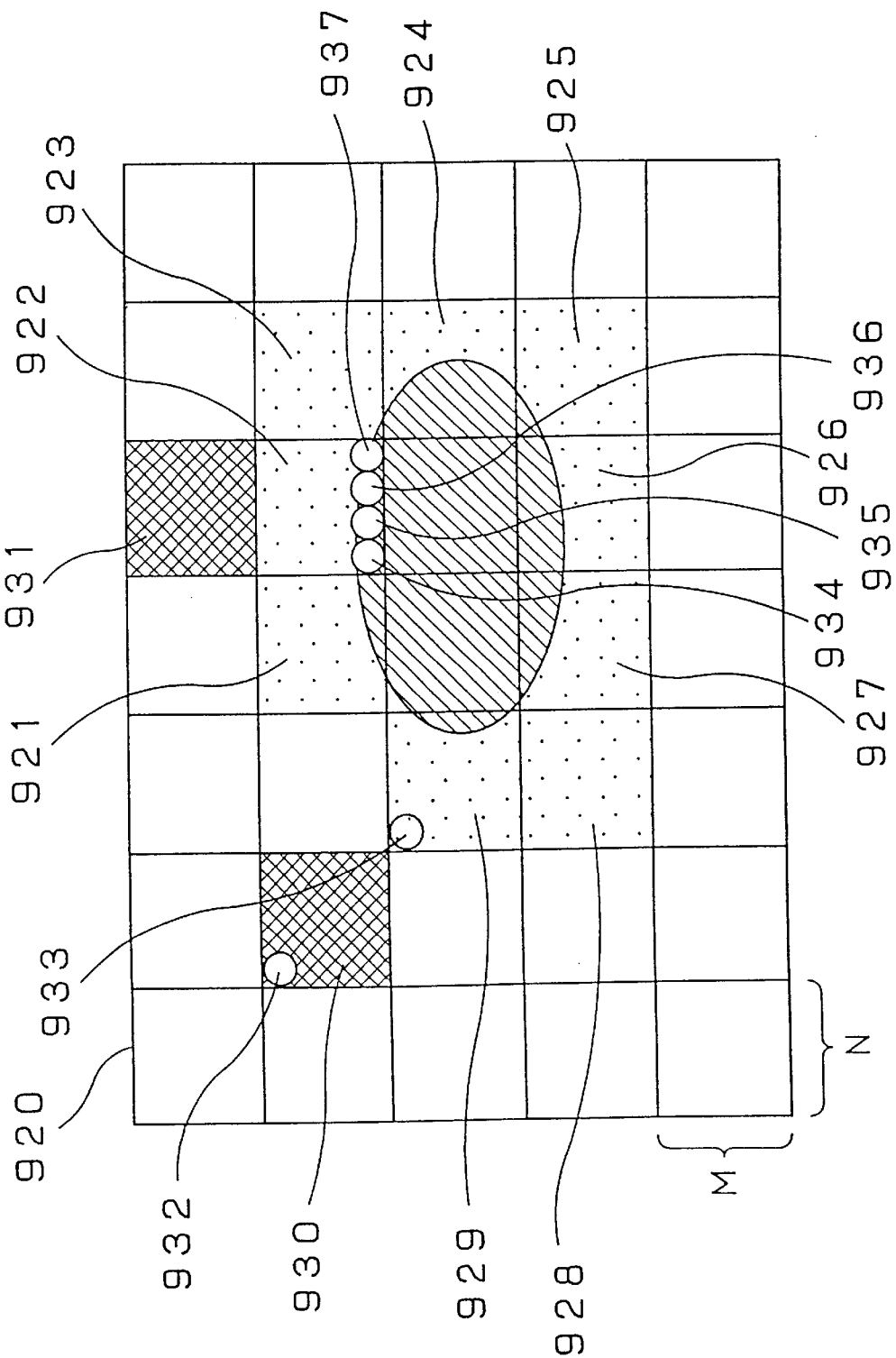
FIG. 8 is a schematic diagram depicting a padding method of a digital picture in a fourth exemplary embodiment of the present invention.

FIG. 8 is a schematic diagram depicting a padding method of a digital picture in a fourth exemplary embodiment of the present invention.

A picture 920 is resolved into blocks each of which consists of M×N samples, and then are padded. Preferably M=N=8 or 16, or another arbitrary value is acceptable, or the picture can be resolved into triangles or another shape. Blocks 921 through 929 include partially significant samples, and insignificant samples thereof are padded through the method previously described by referring to the values of the significant samples.

When blocks 930 and 931, which do not contain significant samples, are padded, a predetermined value (preferably "128") is used for padding, or the nearest sample value is referred for padding. The block 930 is taken as an example; the block 930 is nearest to a block 929 among the blocks having significant samples. This is obtained by finding a distance between the coordinates points in the upper left corners of respective blocks. Then an average of significant samples in the block 929 is taken to be used for padding.

In the case of the block 931, the nearest block which has significant samples is a block 922, therefore, an average of the significant samples can be taken for padding; however, samples 934, 935, 936 and 937 in boundary can be repeated for padding.

As such, padding block by block in the predetermined procedure can realize more efficient calculation process.

Various exemplary embodiments are available as follows when the method of padding a digital picture according to the present invention is applied to a picture encoder and decoder.

(Exemplary Embodiment 5)

Figure 9:
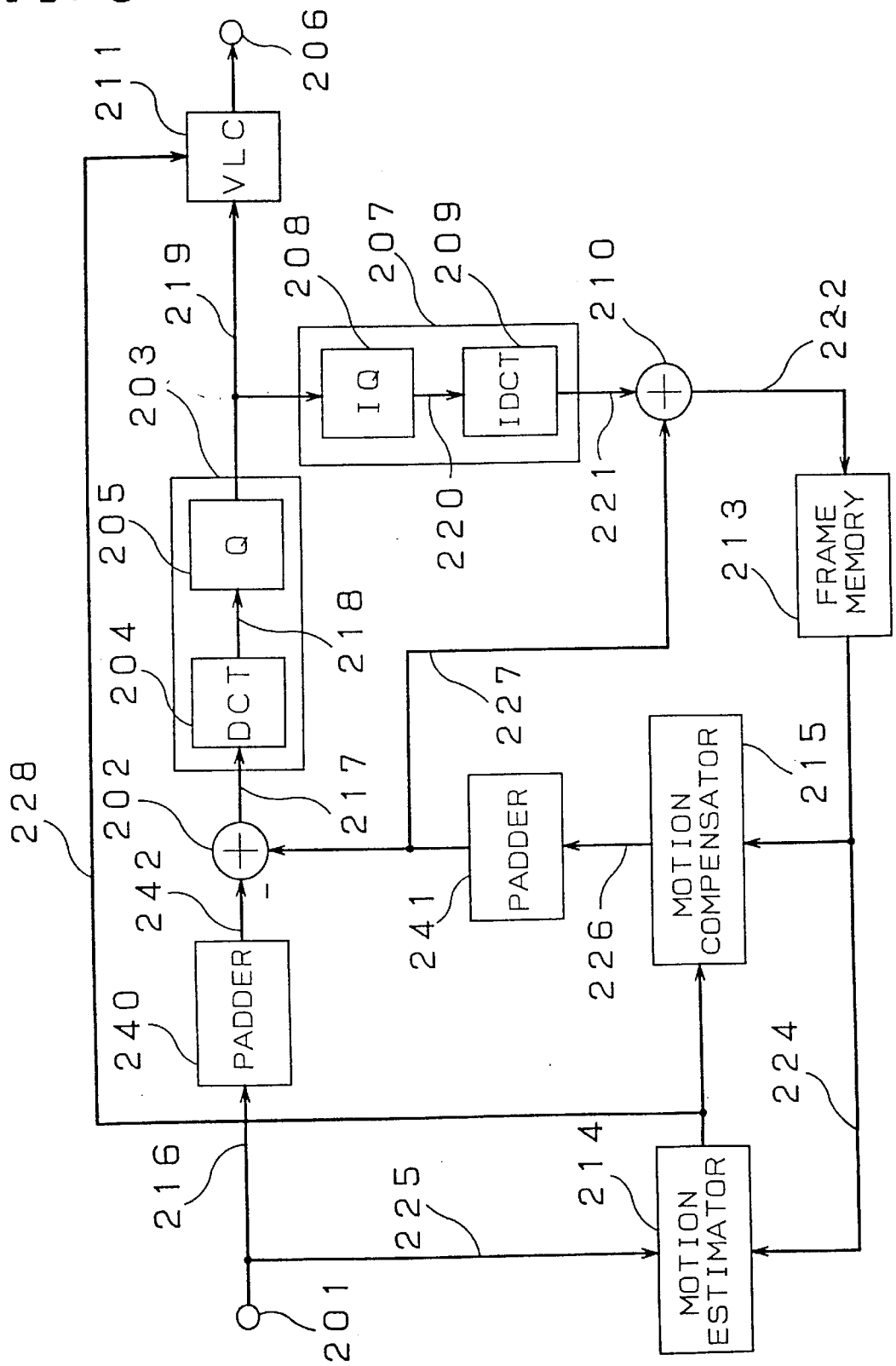
FIG. 9 is a schematic diagram depicting a padding method of a digital picture in a fifth exemplary embodiment of the present invention.

FIG. 9 is a schematic diagram depicting a digital picture encoder in a fifth exemplary embodiment of the present invention. FIG. 9 lists the following elements: an input terminal 201, a first adder 202, an encoder 203, a discrete cosine transformer (DCT) 204, a quantizer 205, an output terminal 206, a decoder 207, an inverse quantizer 208, an inverse discrete cosine transformer 209, a second adder 210, variable length encoder (VLC) 211, a frame memory 213, a motion estimator 214, a motion compensator 215, a first padder 240, and a second padder 241.

An operation of the digital picture encoder comprising the above elements is detailed hereinafter. First, input a picture having an arbitrary shape into the input terminal 201. Second, resolve the picture into a plurality of regions adjoining each other. In this embodiment, the picture is resolved into blocks each of which consists of 8×8, or 16×16 samples; however, an any other shapes can be acceptable. Then, input subject blocks to be encoded into the motion estimator 214 via a line 225. At the same time, input a previously reproduced picture (hereinafter called a reference picture) stored in a frame memory 213 into the motion estimator 214, and then, output a motion displacement information (hereinafter called a motion vector) which gives the prediction signal having the least error with respect to the subject block through the block-matching method or other methods. Third, send this motion vector to the motion compensator 215, where a prediction block is produced from the reference picture. The motion vector is sent to the VLC 211 via a line 228, and is converted into a variable length signal.

The subject block is sent to the first padder 240, where the block is padded through the method previously mentioned to produce a padding subject block. A prediction block is sent to the second padder 241, where the block is padded through the method previously mentioned to produce a padding prediction block.

The padding subject block and padding prediction block are sent to the first adder 202, where a difference between the two blocks is found to produce a differential block, which is compressed by the encoder 203, namely by the DCT 204 and quantizer 205, in this exemplary embodiment. The quantized data is sent to the VLC 211, where the data is converted into a variable length code, which is fed together with other side information including motion vectors into the output terminal 206.

On the other hand, the compressed data is sent to the decoder 207, where the data is expanded, namely, the compressed data undergoes the inverse quantizer 208 and is expanded into a data in spatial domain by IDCT 209. The expanded data of the differential block is added to a padding prediction block data which is sent via line 227 to produce a reproduced block. The data of the reproduced block is stored in the frame memory 213. To indicate whether a sample value is significant or insignificant, a corresponding shape signal, encoded and subsequently decoded, is used as reference, although this is not shown in the drawings.

As such, a subject block and a prediction block are padded, whereby a large predicted error, which is caused by a shift of an edge part because of a motion compensation, can be suppressed.

This is not shown in the drawings; however, the padder 246 can be placed before the motion compensator 215. In this embodiment, DCT is adopted; however, a shape adaptive DCT, subband or wavelet can be adopted instead.

(Exemplary Embodiment 6)

Figure 10:
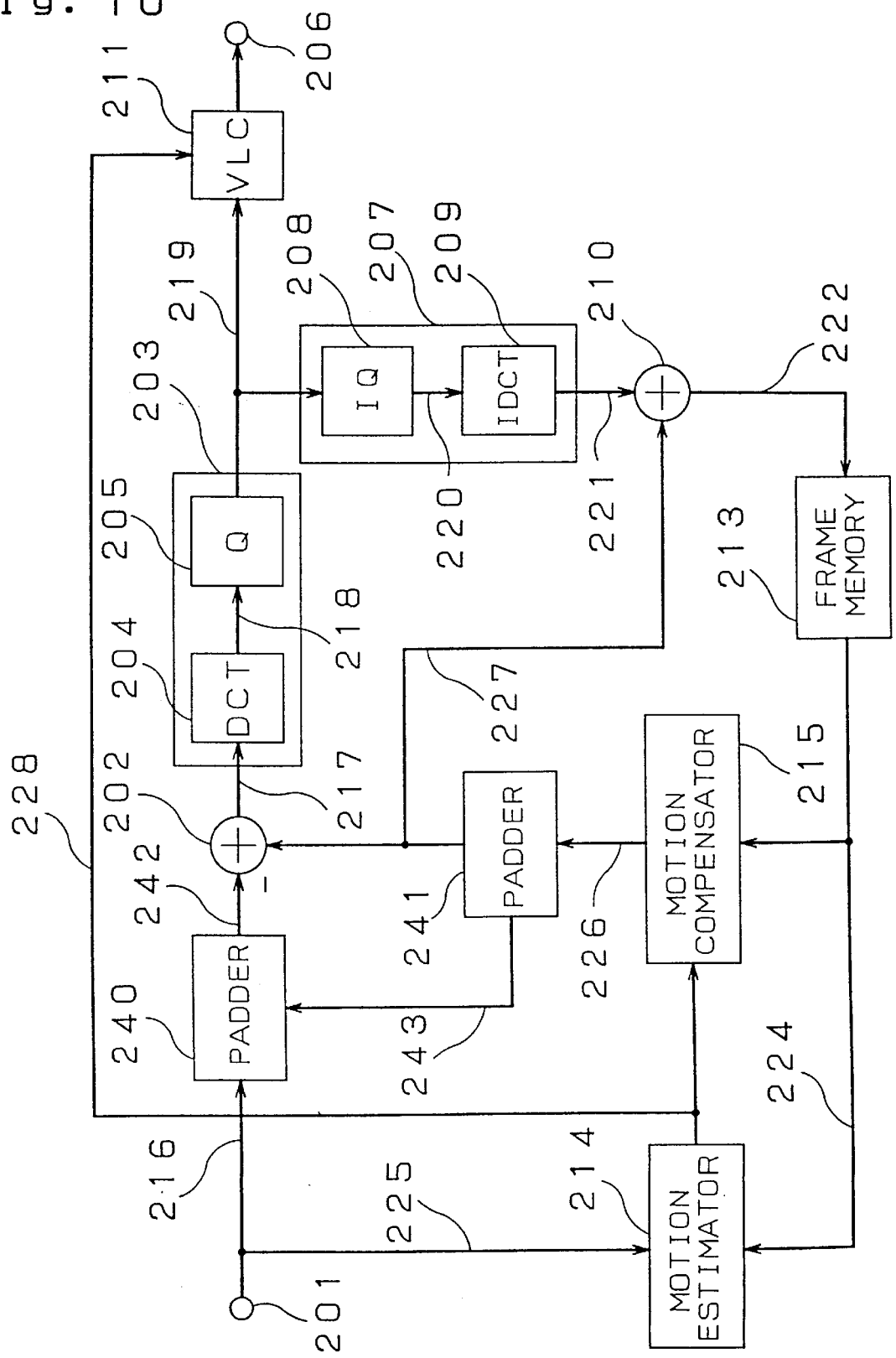
FIG. 10 is a schematic diagram depicting a padding method of a digital picture in a sixth exemplary embodiment of the present invention.

FIG. 10 is a schematic diagram depicting a digital picture encoder in a sixth exemplary embodiment of the present invention. The sixth exemplary embodiment has basically the same operation as that of the fifth exemplary embodiment. The different point is at the first adder 240, a value for padding the prediction block is used for padding the subject block. This value is transmitted from the second padder 241 via a line 243 to the first padder 240. Sharing the padding value as such makes almost all the differential values "0" (zero), whereby the prediction error is further suppressed.

(Exemplary Embodiment 7)

Figure 11:
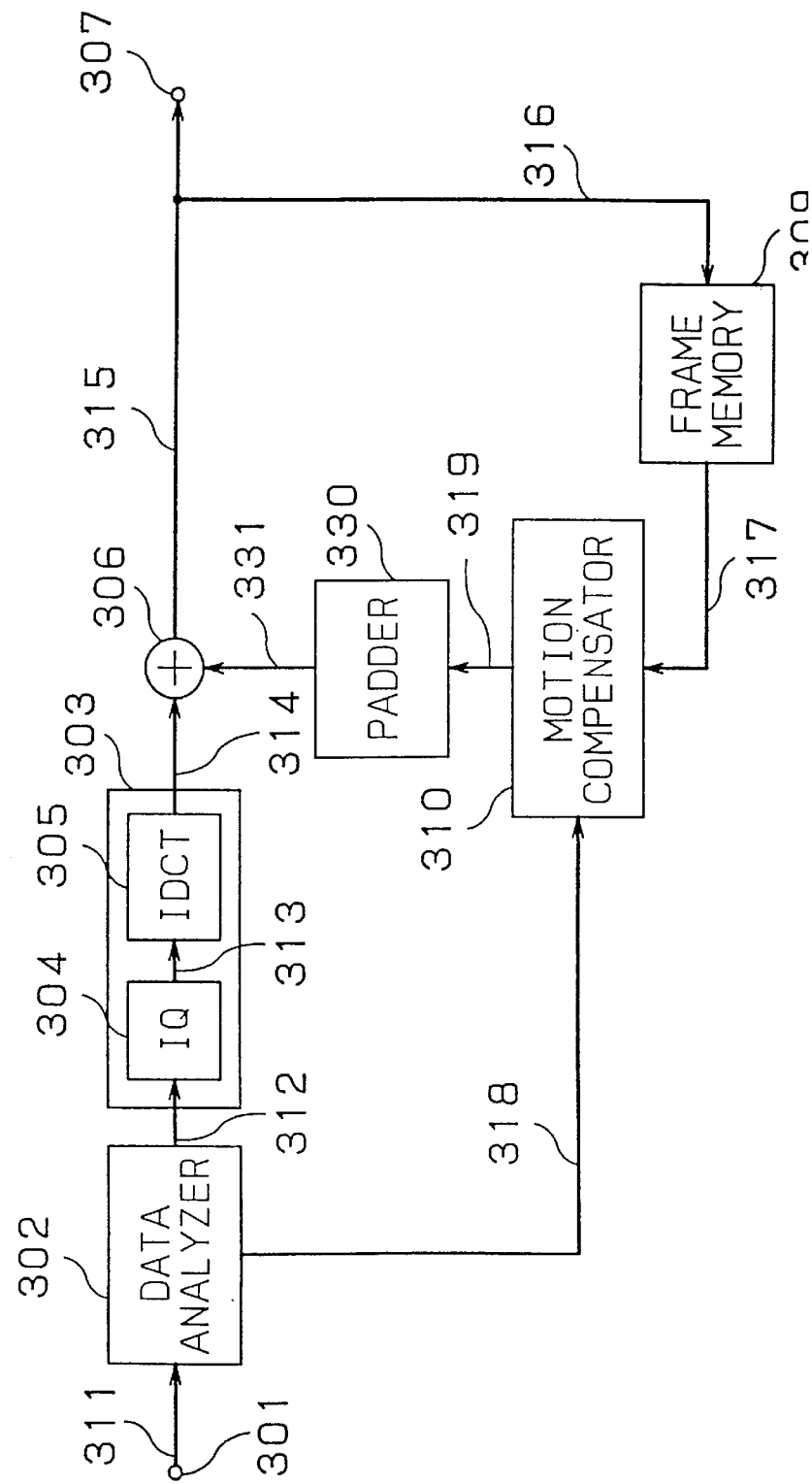
FIG. 11 is a schematic diagram depicting a padding method of a digital picture in a seventh exemplary embodiment of the present invention.

FIG. 11 is a schematic diagram depicting a digital picture decoder in a seventh exemplary embodiment of the present invention. FIG. 11 lists the following elements: input terminal 301, data analyzer (parser) 302, inverse quantizer 304, IDCT 305, adder 306, output terminal 307, frame memory 309, motion compensator 310 and a padder 330.

An operation of the digital picture decoder comprising the above elements is detailed hereinafter. First, input a compressed data into the input terminal 301, then analyze the data by the data analyzer 302, second, output the data of the compressed differential block to the decoder 303 via a line 312, third, output a motion vector to the motion compensator 310 via a line 318. In the decoder 303, expand the compressed differential block to restore thereof to a expanded differential block, namely, in this embodiment, the compressed differential block undergoes the inverse quantizer 304 and IDCT 305, where a signal in the frequency domain is transformed into a signal in the spatial domain. Then, input the motion vector via a line 318 into the motion compensator 310, where an address for accessing the frame memory 309 is produced based on the motion vector, and a prediction block is produced using the picture to be stored in the frame memory 309. Then, transmit the prediction block into the padder 330, where insignificant samples are padded through the method previously detailed, and thereby producing a padding prediction block. Next, input the padding prediction block and the expanded differential block into the adder 306 to add both the block, thereby producing a reproduced block. Finally, output the reproduced block to the output terminal 307, and at the same time, store the reproduced block into the frame memory 309.

Figure 14:
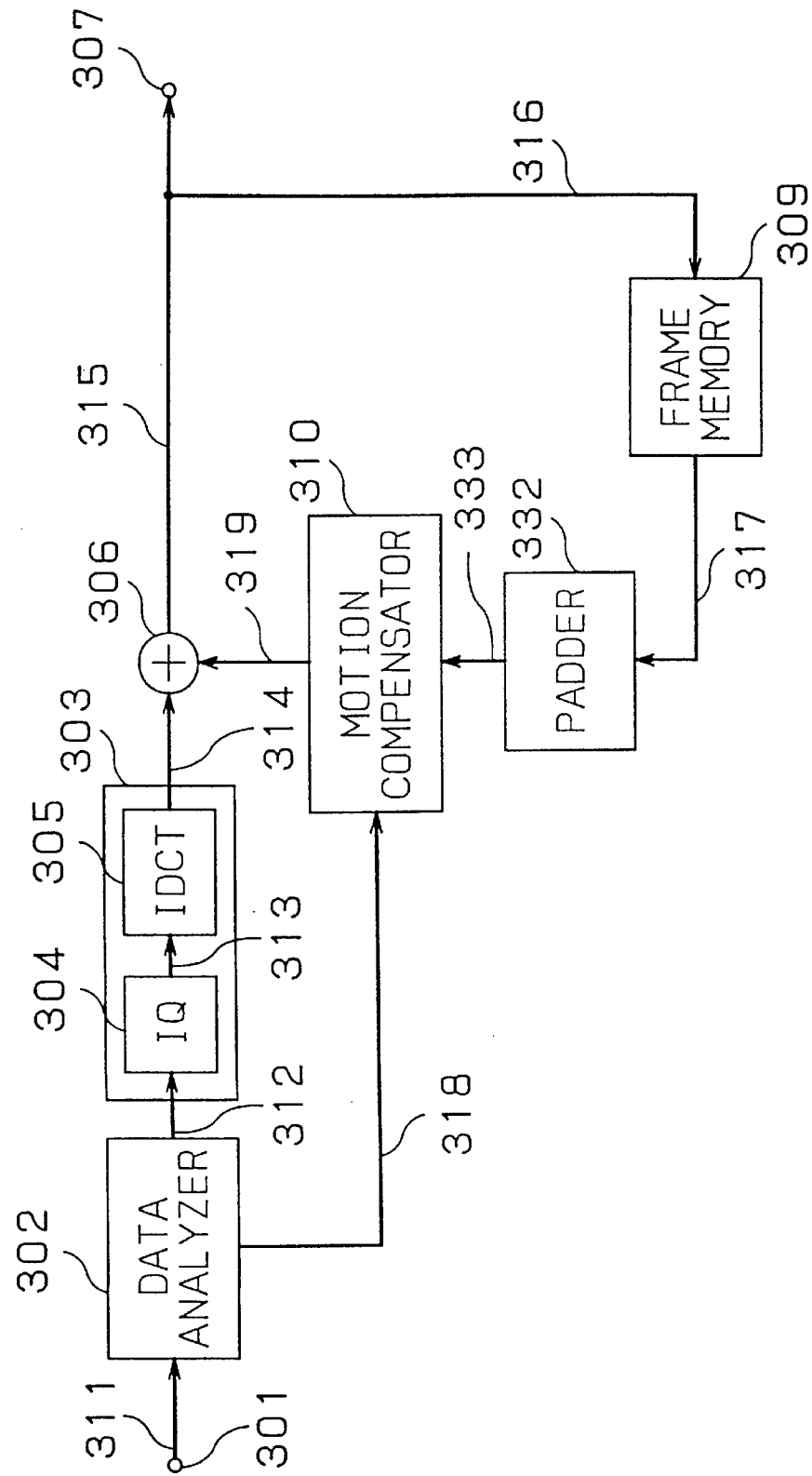
FIG. 14 is a schematic diagram depicting a first modification of the padding method of the digital picture in the seventh exemplary embodiment of the present invention.

The above embodiment describes that the prediction block undergone the motion compensation is padded; however, the block can be padded during the motion compensation, which includes overlapped motion compensation. To indicate whether a sample value is significant or insignificant, a decoded shape signal should be referred, although this is not shown in the drawings. FIG. 14 is a schematic diagram depicting a first modification of the padding method of the digital picture in the seventh exemplary embodiment of the present invention, and has basically the same operation shown in FIG. 11. In this embodiment, the padder 332 is placed before the motion compensator 310.

(Exemplary Embodiment 8)

Figure 12:
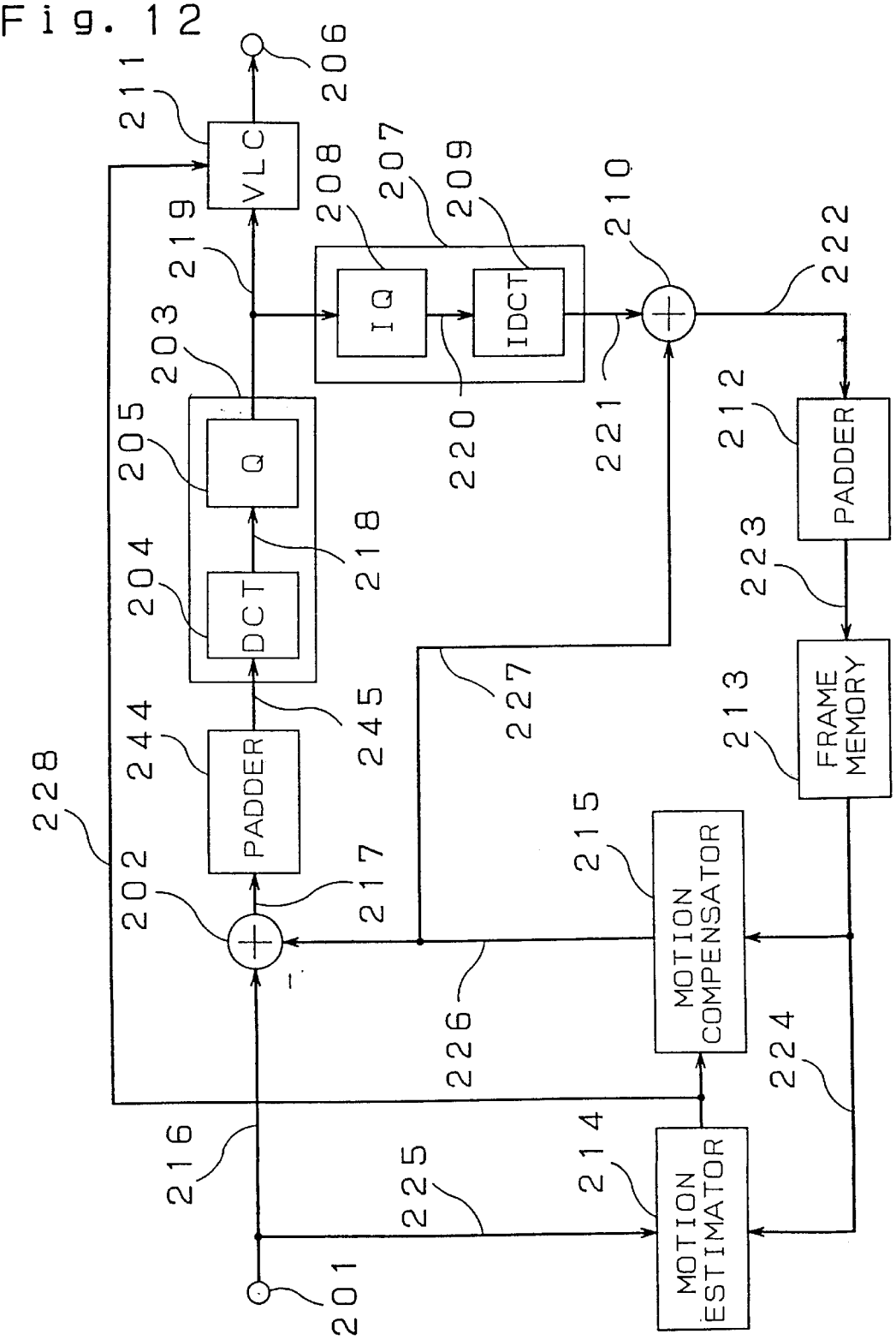
FIG. 12 is a schematic diagram depicting a padding method of a digital picture in a eighth exemplary embodiment of the present invention.

FIG. 12 is a schematic diagram depicting a digital picture encoder in an eighth exemplary embodiment of the present invention. The basic operation is the same as shown in FIG. 9. The padder 212 is placed before the frame memory, whereby a reproduced block tapped off from the adder 210 can be advantageously padded immediately. Further the padder 244 is placed before DCT 204. The padder 244 pads the blocks so that DCT coefficients becomes smaller. Regarding the differential block, in particular, insignificant regions of the subject blocks are padded with "0" (zero).

Figure 13:
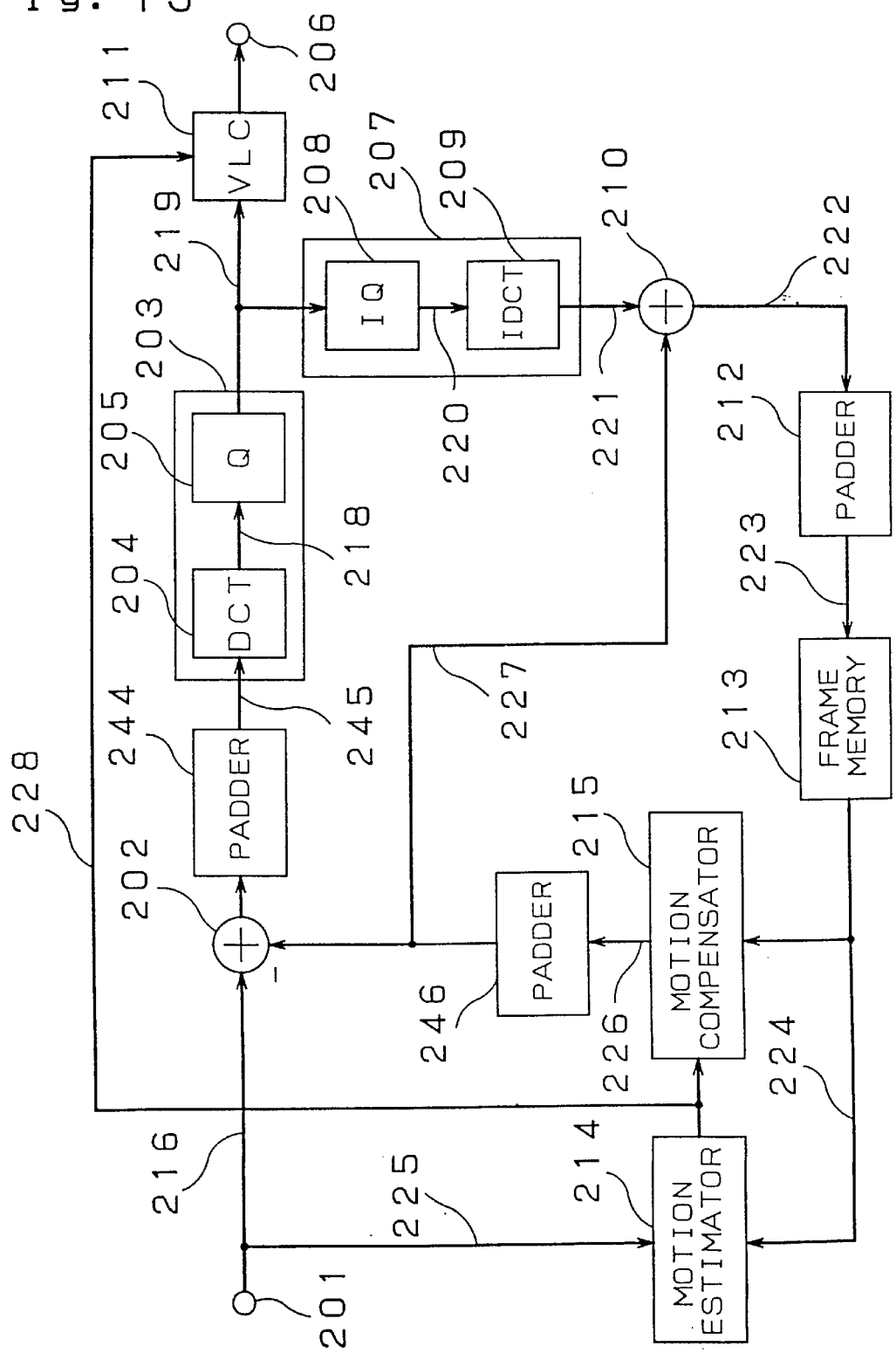
FIG. 13 is a schematic diagram depicting a padding method of a digital picture in a ninth exemplary embodiment of the present invention.

FIG. 13 is a schematic diagram depicting a padding method of a digital picture in a ninth exemplary embodiment of the present invention. The padder 246 is placed after the motion compensator 215, which is an additional element to those in FIG. 12. After the motion compensation, the predicted signal is further padded in order to give an effectiveness of suppressing the prediction errors. This is not shown in the drawings, however, the padder 246 can be placed before the motion compensator 215.

(Exemplary Embodiment 9)

Figure 15:
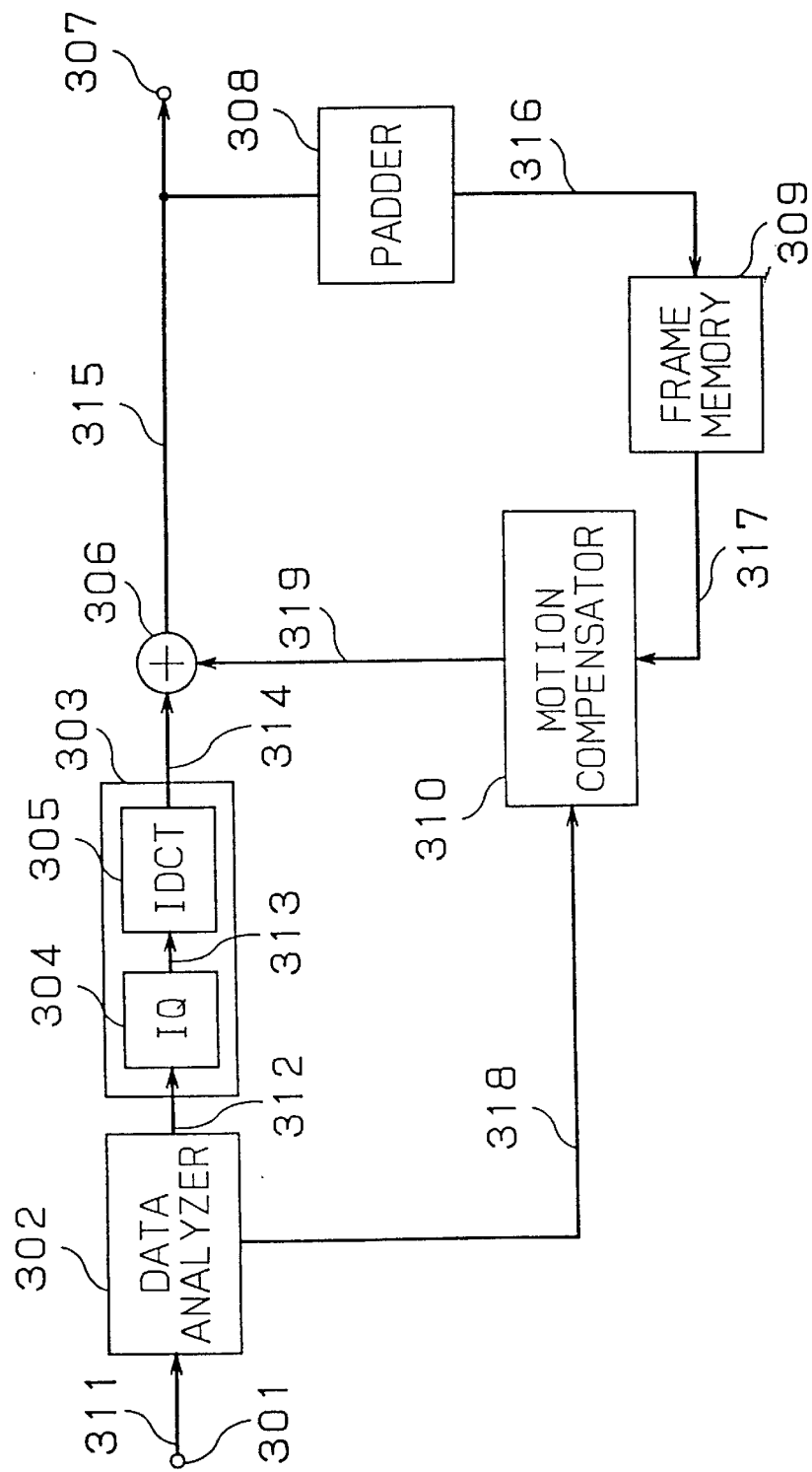
FIG. 15 is a schematic diagram depicting a padding method of a digital picture in a ninth exemplary embodiment of the present invention.

FIG. 15 is a schematic diagram depicting a digital picture decoder in a ninth exemplary embodiment of the present invention. This decoder corresponds to the decoder depicted in FIG. 12. The operation of this decoder is basically the same as that in FIG. 14. In this embodiment, a padder 308 is placed before the frame memory 309, whereby a reproduced block can be padded immediately and then stored in the frame memory 309.

Figure 16:
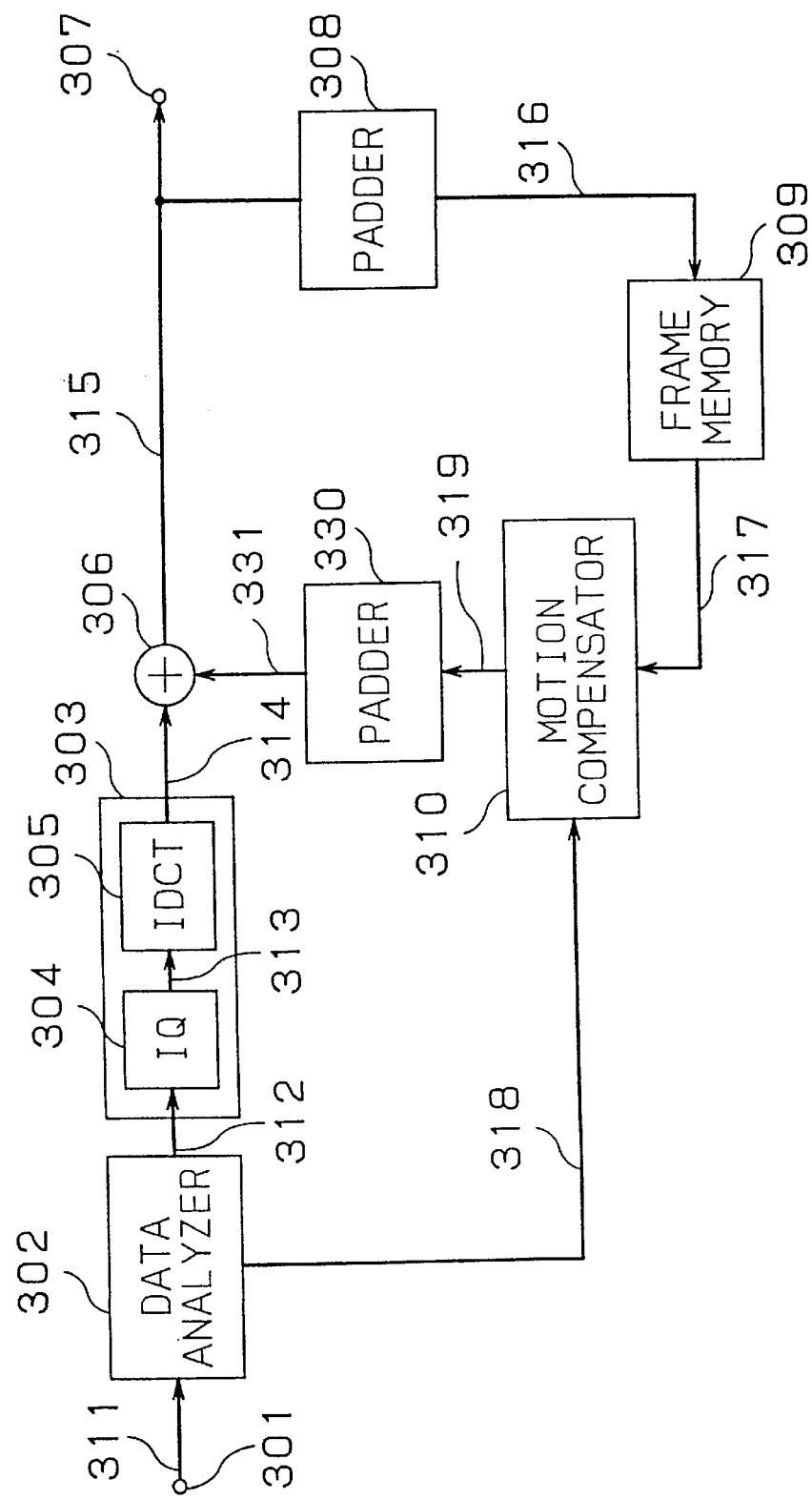
FIG. 16 is a schematic diagram depicting a first modification of the padding method of the digital picture in the ninth exemplary embodiment of the present invention.

FIG. 16 is a schematic diagram depicting a first modification of the decoder of the digital picture in the ninth exemplary embodiment of the present invention. This decoder corresponds to that in FIG. 13. The operation of the decoder is basically the same as that in FIG. 15. Only the different point is that a padder 330 is placed after the motion compensator 310 in order to pad the predicted block.

(Exemplary Embodiment 10)

Figure 17:
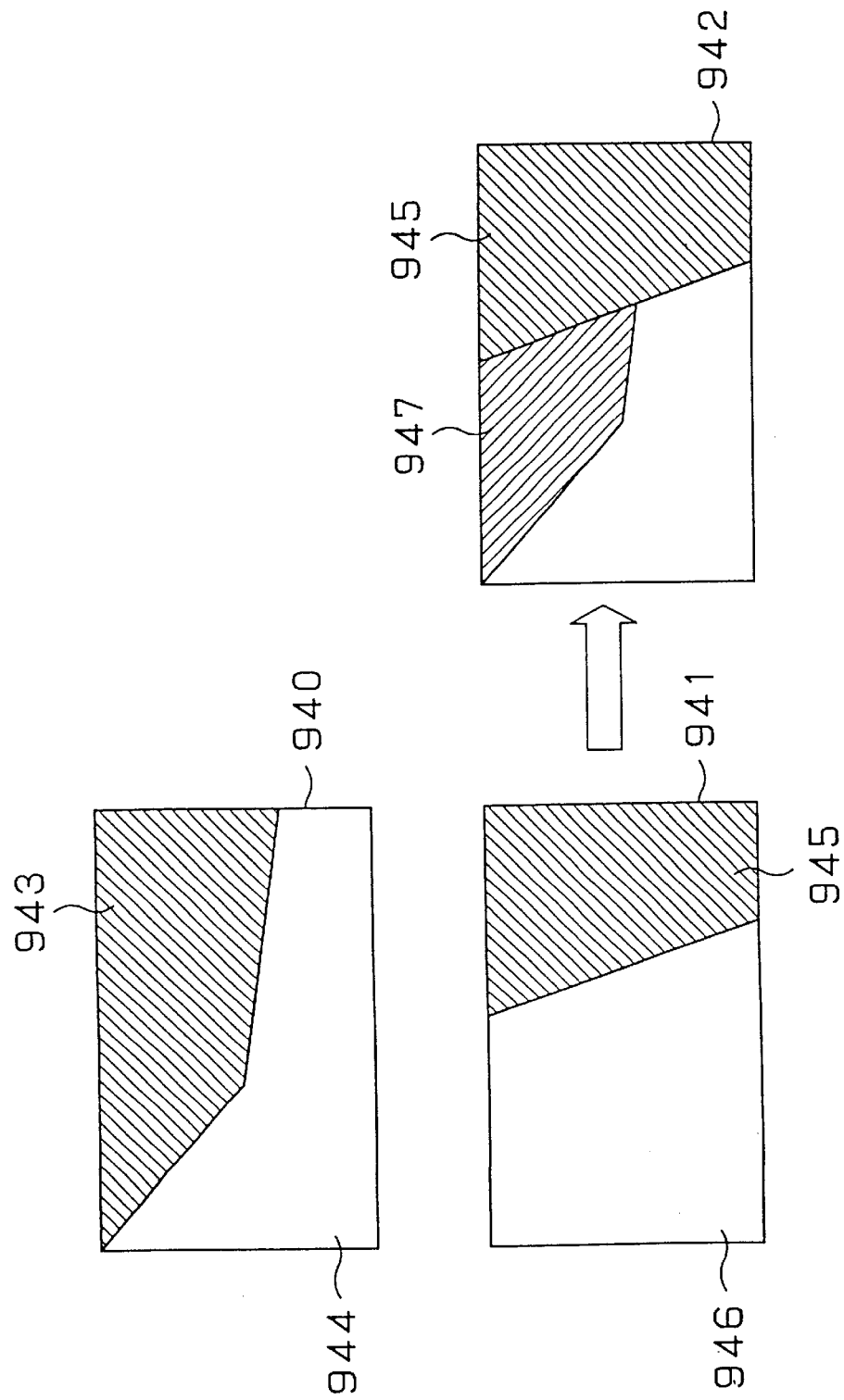
FIG. 17 is a schematic diagram depicting a padding method of a digital picture in a tenth exemplary embodiment of the present invention.

FIG. 17 is a schematic diagram depicting a padding method employed in an encoder/decoder of a digital picture in a tenth exemplary embodiment of the present invention. The operation of the padder 330 is described hereinafter using FIG. 11 as an example. In FIG. 17, a subject block comprises collected significant samples 943 and collected insignificant samples 944. A portion hatched by oblique lines represents significant regions. A predicted block 941 is obtained through a motion compensation, and comprises collected significant samples and collected insignificant samples.

In the decoder shown in FIG. 11, a predicted block 941 is padded and then sent to the adder 306. In the padder 330, the entire insignificant region (of the predicted block) 946 can be padded; however, it preferable to pad the insignificant region of the predicted block covered by the significant region of the subject block because of the less calculation volumes. By referring to the shape of the subject block 940, both the significant and insignificant regions are determined (region 947 of the block 942), and then only the region 947 is padded by referring to itself.

Figure 18:
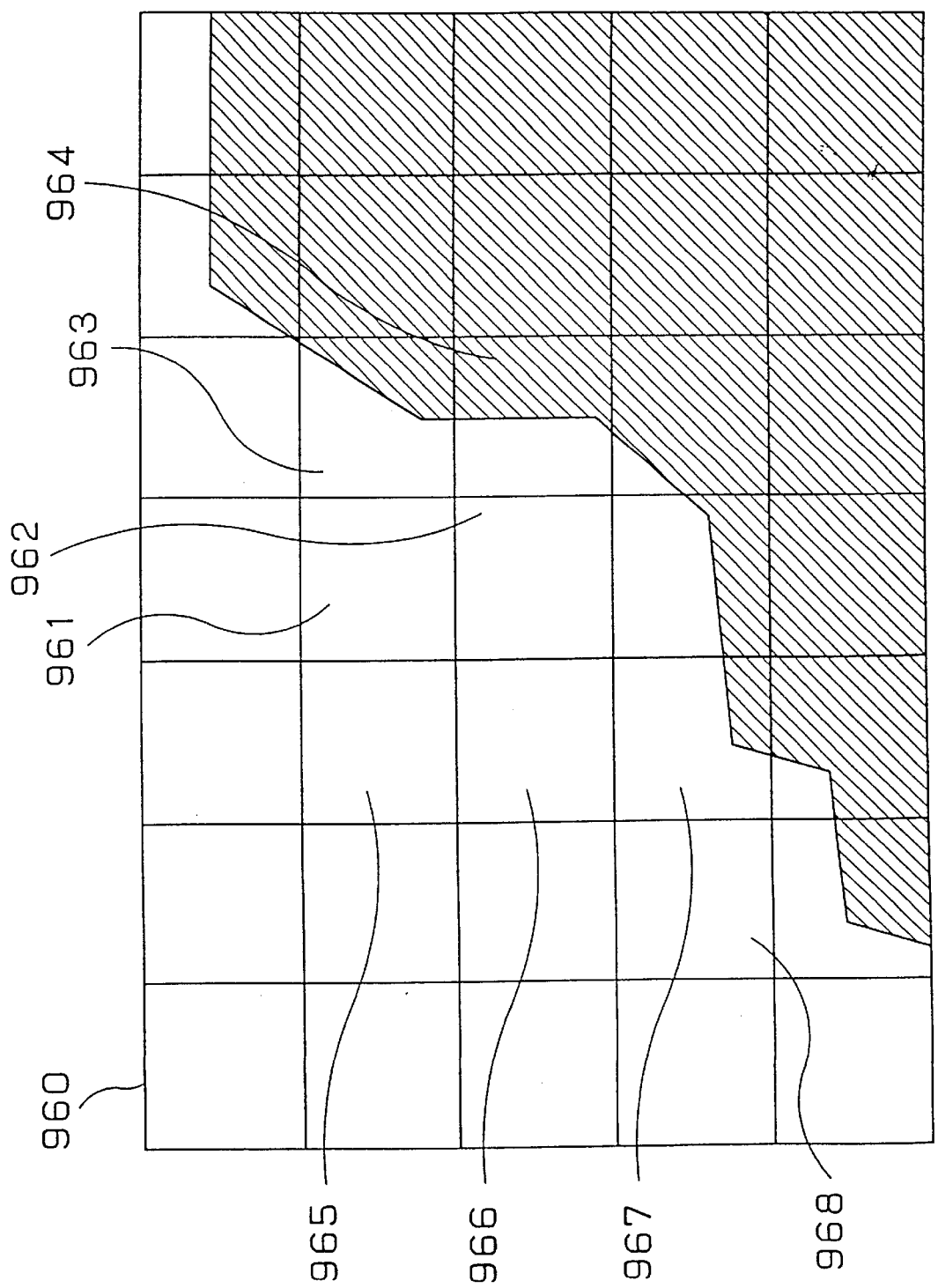
FIG. 18 is a schematic diagram depicting a first modification of the padding method of the digital picture in the tenth exemplary embodiment of the present invention.

FIG. 18 is a schematic diagram depicting a modification of the padding method employed in a digital picture encoder/decoder in the tenth exemplary embodiment of the present invention. Assume that no significant samples exist in a subject block of padding, and the padder 308 shown in FIG. 15 is used as an example. Assume that a block 962 of FIG. 18 is the subject block of padding, and since no significant samples exist in this block, the block cannot be padded within the block by referring to itself.

In order to overcome the above problem, find an adjacent block comprising at least one significant sample, and pad the subject block by referring to the adjacent block. The padder in FIG. 15; however, reproduces the block 962 in advance of the block 964, thus it is impossible to pad the block by referring to the block 964. Then, search the reproduced blocks 966, 965, 961 and 963 sequentially for a first block which contains significant samples, and pad the block by referring to the found block.

In the case that the predicted block undergone the motion compensation does not have a significant sample, a subject block is padded in the same manner, i.e., through referring to the reproduced blocks having a significant sample and being adjacent to the subject block. A method of calculating a padding value can be an averaging method or a repetitive padding method.

The above embodiments prove that the picture encoder and decoder of the present invention can encode insignificant pixels, which do not influence a picture quality, by making the pixels such values as increasing the coding efficiency, whereby the coding efficiency is promoted, thus the encoder and decoder of the present invention have a great advantage in practical uses.

(Exemplary Embodiment 11)

Figure 19:
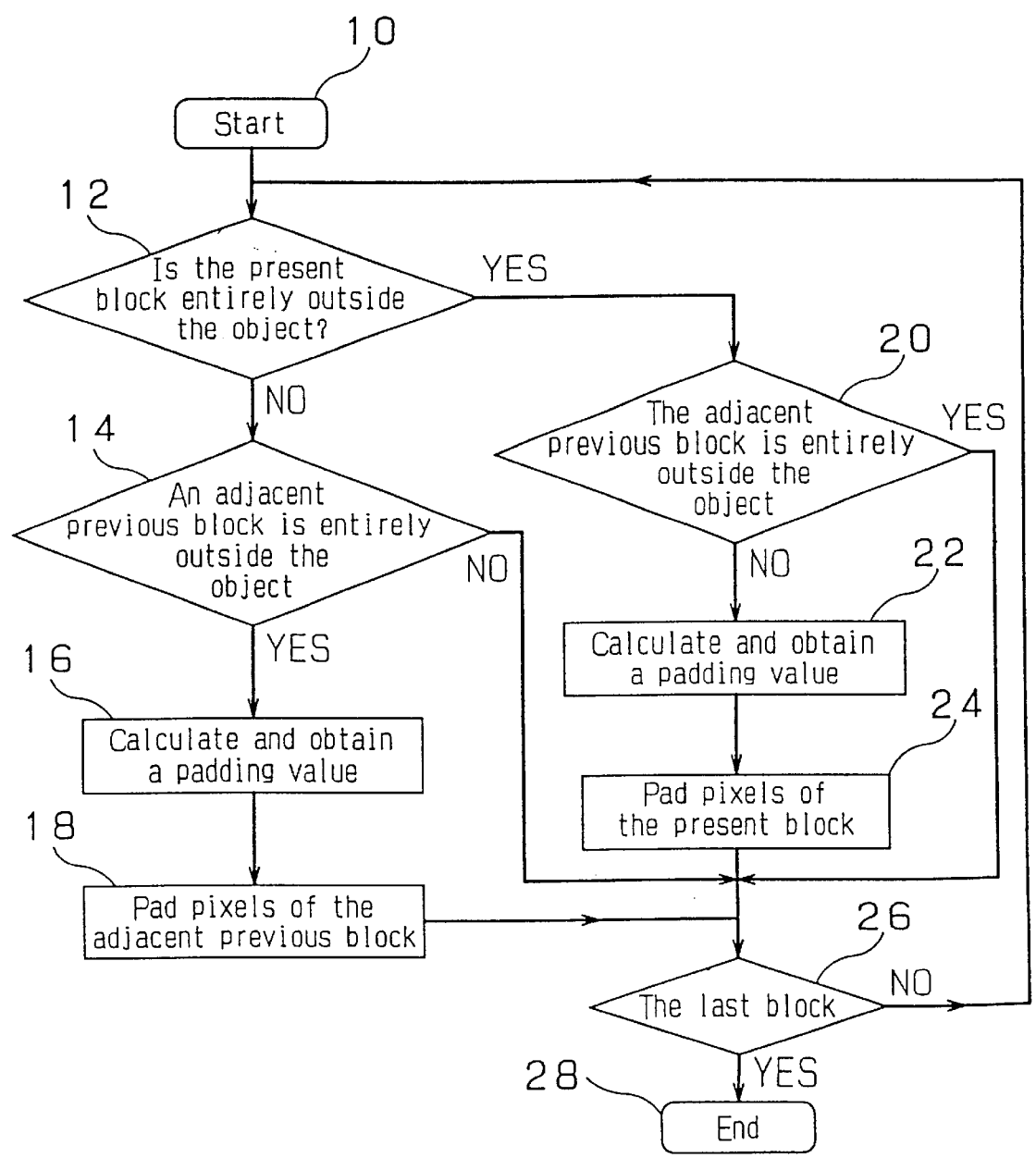
FIG. 19 is a flow chart depicting a padding method of a digital picture in a $11^{th}$ exemplary embodiment of the present invention.

FIG. 19 is a flow chart depicting a padding method of a digital picture in an 11$^{th}$ exemplary embodiment of the present invention. First, input a picture having an arbitrary shape, second resolve the picture into regions adjacent with each other, third, scan each region according to a predetermined order, and finally, process each region one by one according to the flow chart shown in FIG. 19. In this embodiment, start scanning from the upper left and follow the same order as the raster scanning. The scanned region can be a triangle, rectangle or square. In this embodiment, the picture is resolved into squares each of which consisting of N×N samples, where N=8 or 16. The square of N×N samples is called a block hereinafter.

On Step 12, determine whether a subject block is entirely outside an object (picture having an arbitrary shape) or not. When the subject block is entirely outside the object, every sample of the subject block is not significant sample. In this embodiment, to determine whether a sample value is significant or not, the shape signal of the respective picture is referred. When the shape signal is "0", the sample value is insignificant. When the shape signal is "1", the sample value is significant.

When the subject block is not entirely outside the object, advance to Step 14. Then determine whether previous blocks adjacent to the subject block are entirely outside the object or not, where the previous block is the block already processed according to the scanning order. When the adjacent previous blocks are entirely outside the object, on Step 16, a padding value is calculated according to a predetermined method. On Step 18, the sample values of the previous blocks adjacent to the subject block is substituted with the padding value so that the sample values are padded.

On Step 12, when the subject block is entirely outside the object, advance to Step 20. Then determine whether the previous blocks adjacent to the subject block is entirely outside the object or not. When the previous blocks are not entirely outside the object, a padding value is calculated according to the predetermined method on Step 22, and the sample values of the subject block are substituted with the padding value on Step 24 so that the sample values are padded. When the adjacent previous blocks are padded on Step 18, the previous blocks can be taken as not to be entirely outside of the object on Step 20. Repeat this process until the last block is processed (Steps 26 and 28.)

(Exemplary Embodiment 12)

Figure 20:
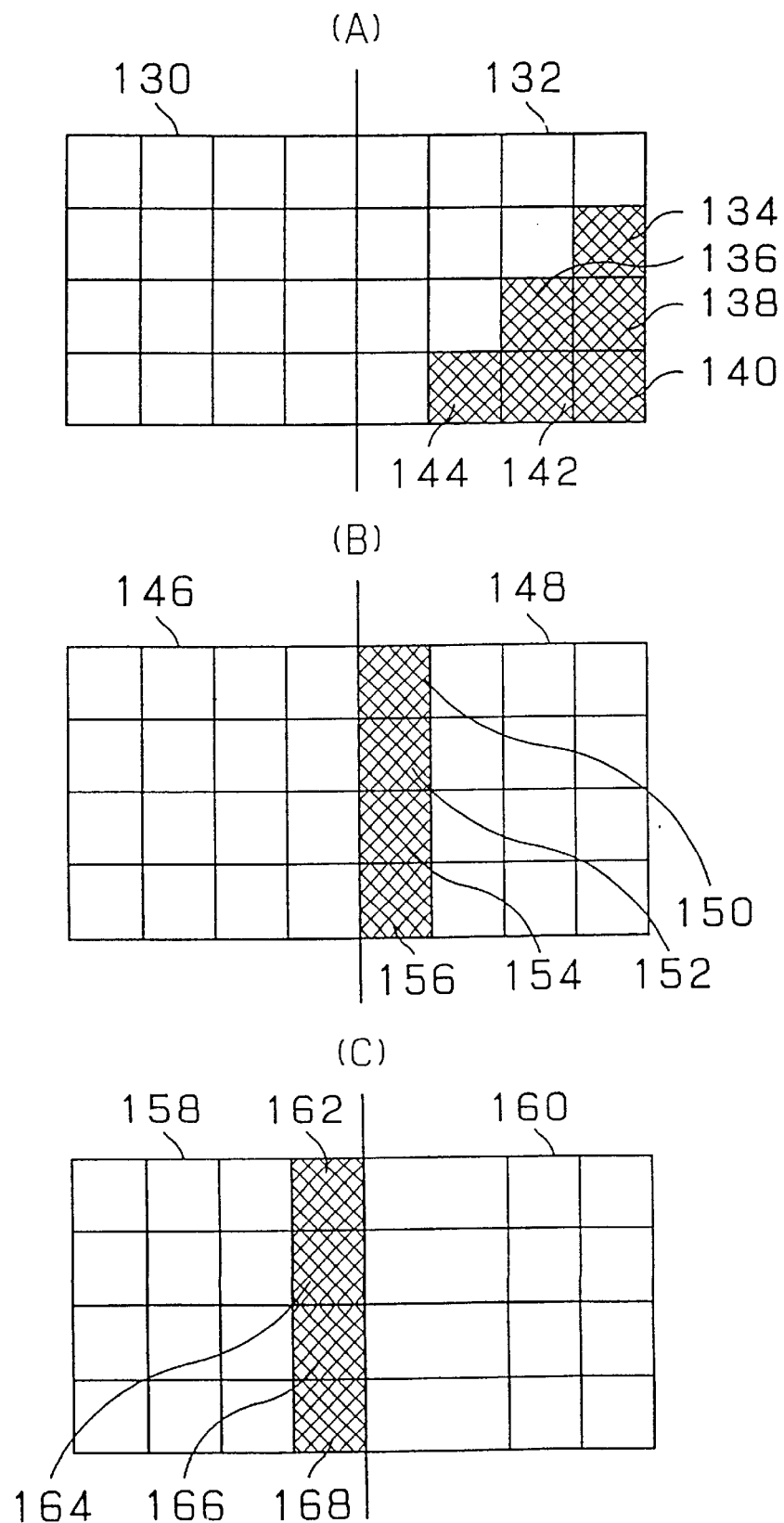
FIG. 20 is a schematic diagram depicting an embodiment of a method of padding a region, which is employed in the padding method of the digital picture in the $11^{th}$ exemplary embodiment of the present invention, where (A) shows an example; a padding value is an average of significant pixel values arranged along the horizontal direction, (B) shows an example; a padding value is repeated significant pixel values arranged along the horizontal direction, and (C) shows another example; a padding value is repeated significant pixel values arranged along the horizontal direction.
Figure 21:
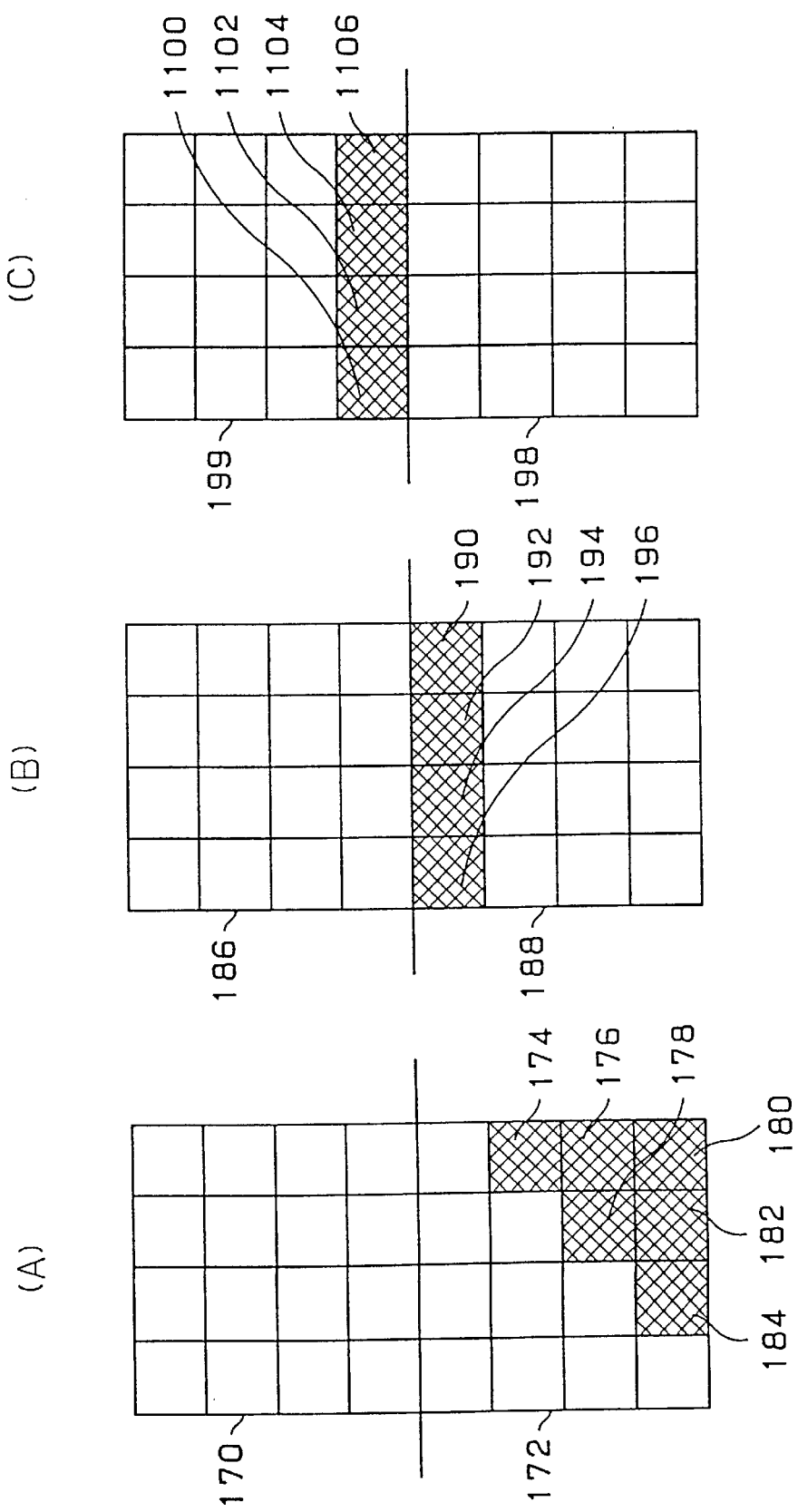
FIG. 21 is a schematic diagram depicting an embodiment of a method of padding a region, which is employed in the padding method of the digital picture in the $12^{th}$ exemplary embodiment of the present invention, where (A) shows an example; a padding value is an average of significant pixel values arranged along the vertical direction, (B) shows an example; a padding value is repeated significant pixel values arranged along the vertical direction, and (C) shows another example; a padding value is repeated significant pixel values arranged along the vertical direction.

FIGS. 20 and 21 are schematic diagram depicting calculation methods of padding values. FIG. 20 shows a case where a present block is adjacent to a previous block in a horizontal direction. In FIG. 20(A), a block 132 is a present block and a block 130 is a previous block. Each lattice represents a sample (pixel) of the picture. Assume that a block 130 is entirely outside an object, and take an average of the values of significant samples, 134, 136, 138, 140, 142 and 144, then substitute the average value for each sample (lattice) in the previous block for padding. In FIG. 20(B), pad each sample (lattice) of the previous block 146, which is entirely outside the object, by repeating values of significant samples 150, 152, 154, 156 of the present block 148. In other words, each lattice on the first, second, third and fourth lines of the previous block 146 is substituted with the values of samples 150, 152, 154, and 156. In FIG. 20(C), the present block 160 is entirely outside the object and the previous block 158 is not outside the object. In this case, each lattice of the present block 160 is padded by repeating values of significant samples 162, 164, 166 and 168 of the previous block 158.

FIG. 21 depicts the case where the present block is adjacent to the previous block in a vertical direction. In FIG. 21(A), a block 172 is the present block and a block 170 is the previous block. Each lattice represents a sample (pixel) of the picture. Assume that a block 170 is entirely outside the object, and take an average of the values of significant samples 174, 176, 178, 180, 182 and 184 which are contained in the present block 172, then substitute the average value for each sample (lattice) in the previous block 170 for padding. In FIG. 21(B), pad each sample (lattice) of the previous block 186, which is entirely outside the object, by repeating values of significant samples 190, 192, 194, 196. In other words, each lattice on the first, second, third and fourth rows of the previous block 186 is substituted with the values of samples 196, 194, 192, and 190. In FIG. 20(C), the present block 160 is entirely outside the object and the previous block 158 is not outside the object. In this case, each lattice of the present block 198 is padded by repeating values of significant samples 1100, 1102, 1104, 1106 of the previous block 199. This embodiment details a block of 4×4 for making the long story short, but the same description can be applied to a block of N×N (N:arbitrary integer (Exemplary Embodiment 13)

Figure 22:
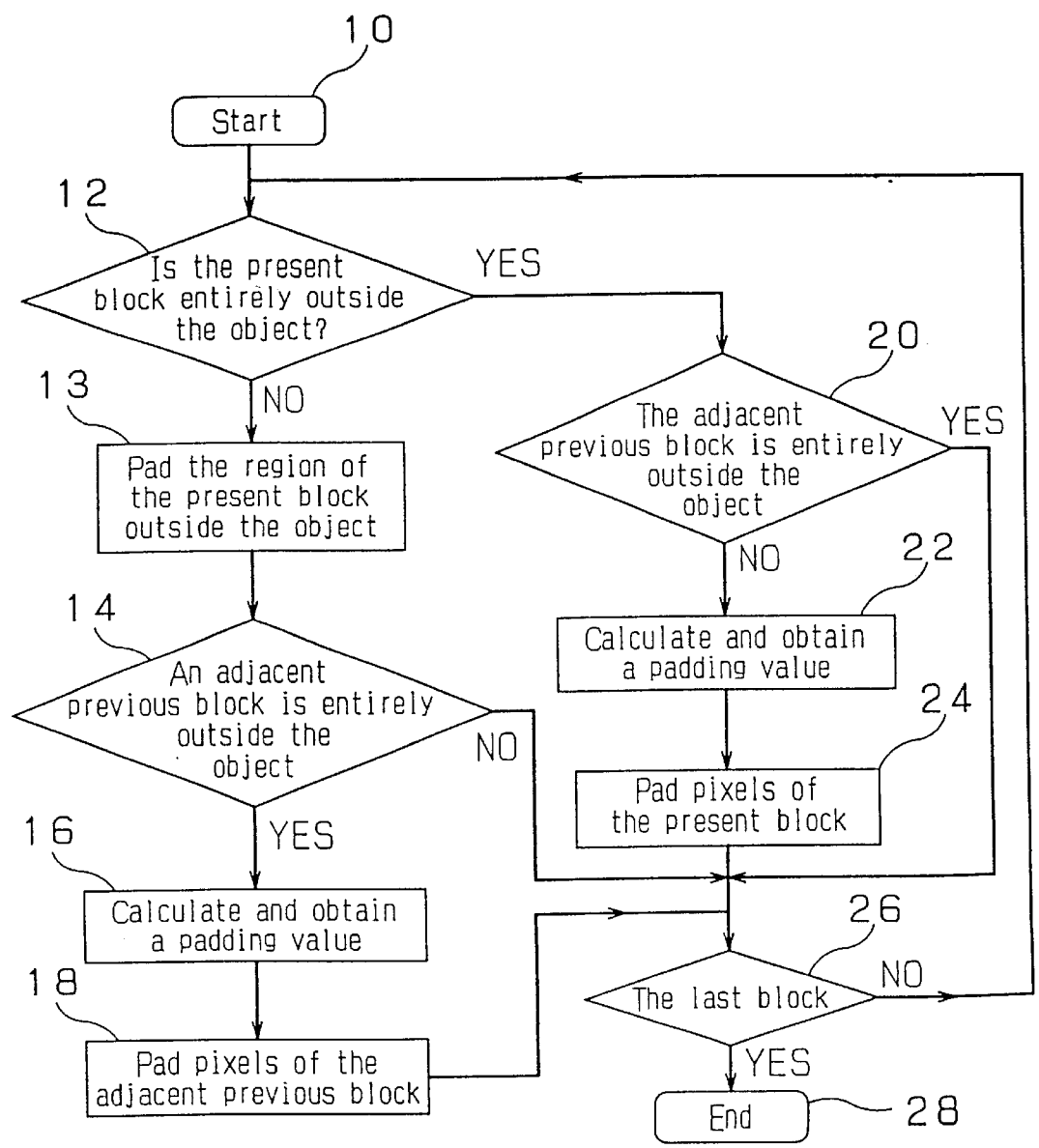
FIG. 22 is a flow chart depicting a padding method of a digital picture in a $13^{th}$ exemplary embodiment of the present invention.

In FIG. 22, Step 13 is added to the flow chart shown in FIG. 19. In other words, when a present block is not entirely outside an object, the region contained in the present block and outside the object is padded through Step 13 and thereafter. The present block 132 of FIG. 20(A) is an example of a block containing regions outside the object. Samples 134, 136, 138, 140 142 and 144 are significant and within the object. The other samples (the lattices not painted) are insignificant and outside the object.

A method of padding these insignificant samples is to substitute the average of significant samples therefor. In this embodiment, the samples 134, 136 and 144 at boundary are repeated in the horizontal and vertical directions for padding. When two padding values are available, an average thereof is used for padding. Due to the padding of the present block through Step 13, all the samples of the present block are substituted with a unique value, therefore, the previous block can be padded on Step 18 by repeating the values of significant samples of the present block existing at the boundary between the present and previous blocks, as shown in FIG. 20(B) or FIG. 21(B). An average of the significant samples can be used instead of repeating the sample values.

(Exemplary Embodiment 14)

Figure 23:
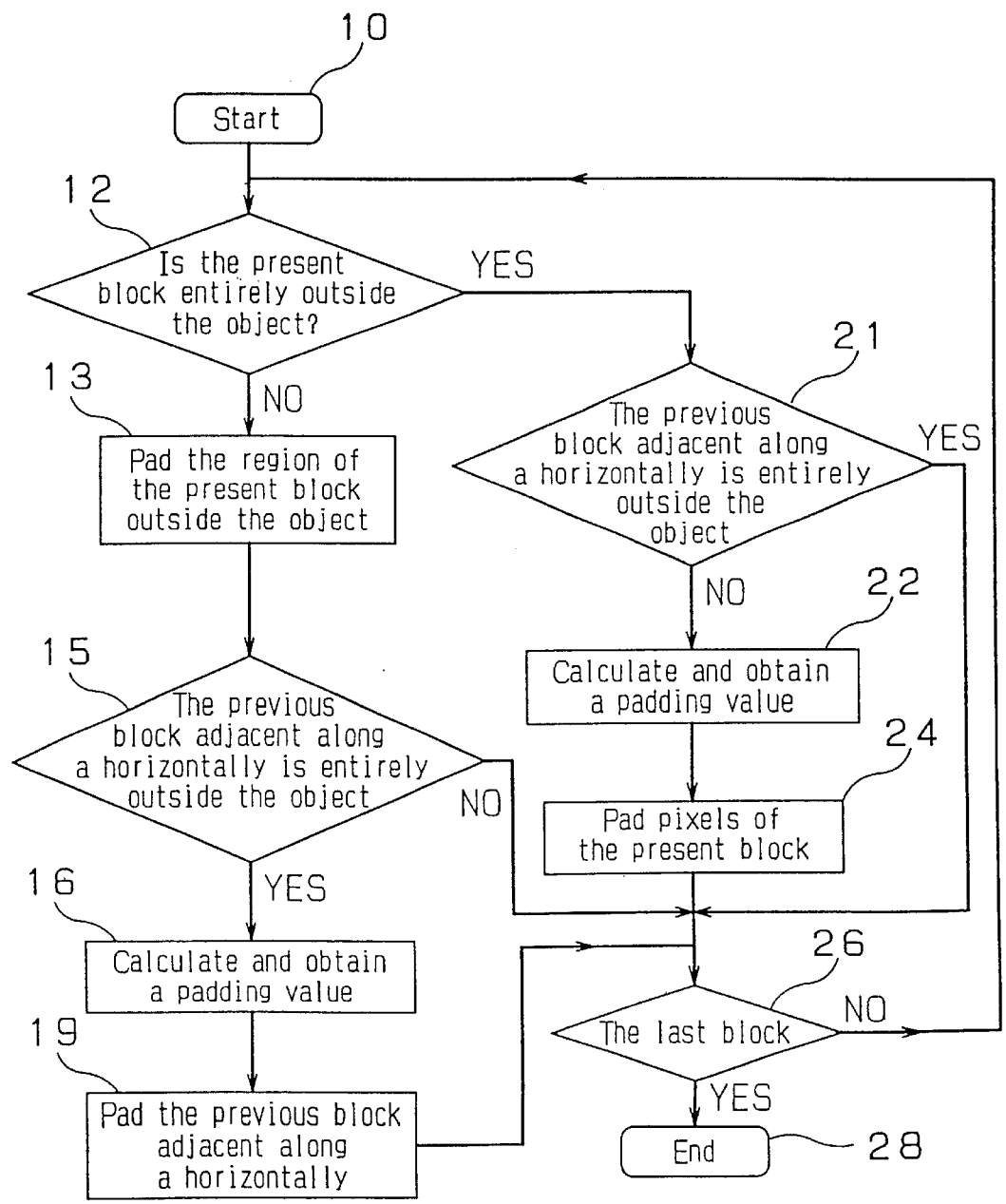
FIG. 23 is a flow chart depicting a second modification of the padding method of the digital picture in a $14^{th}$ exemplary embodiment of the present invention.
Figure 24:
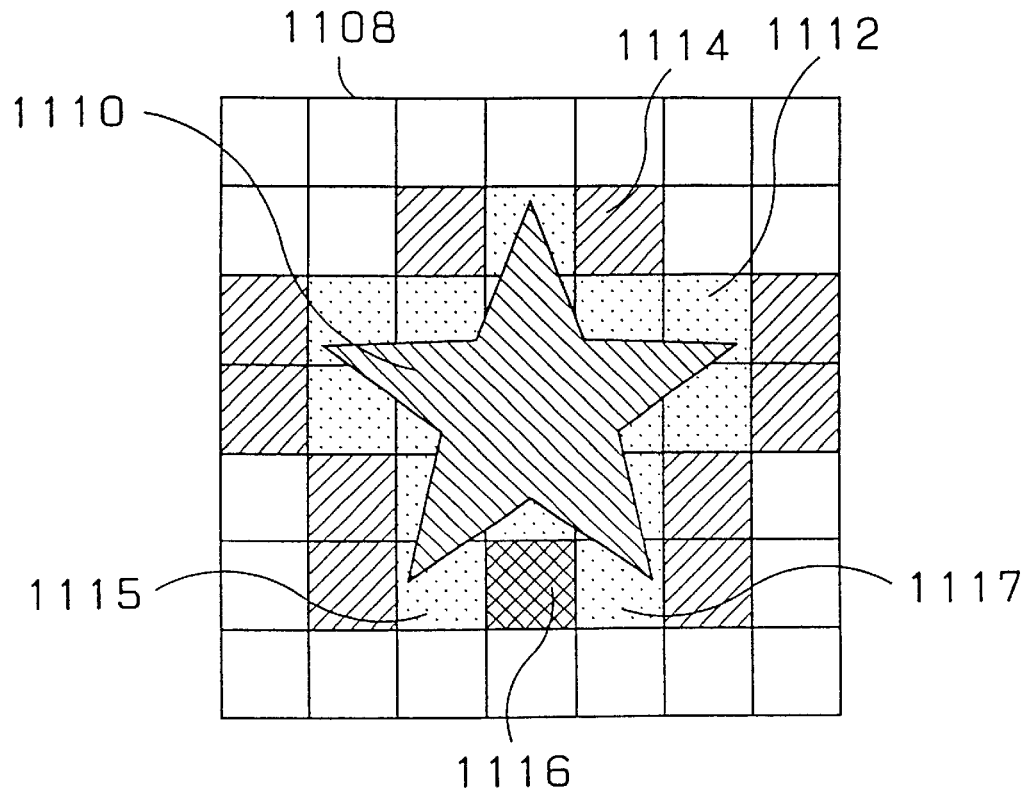
FIG. 24 is a schematic diagram of a first example of the picture padded through the padding method of the digital picture in the $14^{th}$ exemplary embodiment of the present invention.

FIG. 23 is a flow chart depicting the processes where the previous block adjacent to the present block in horizontal direction is utilized on Step 15, 19 and 21 shown in FIG. 22. FIG. 24 shows a picture 108 which is an example padded through the process shown in FIG. 23. A star shape 110 is a significant object, and the other part consists of insignificant samples. The picture 108 is resolved into blocks of 7×7. A block having the same texture as the block 1114 is padded through Step 19 or Step 24 shown in FIG. 23.

The padding method of this embodiment is described by referring to FIGS. 23 and 24. First, the block 1112 is discussed. Since the present block 1112 is not entirely outside the object on Step 12, the present block is padded through Step 13. On Step 15, the previous block adjacent to the present block is not entirely outside the object, thus no padding is provided.

Next, the block 1114 is discussed. Since the present block 1114 is entirely outside the object, the process is advanced to Step 21, where the previous block adjacent to in the horizontal direction is not entirely outside the object, thus the present block 1114 is padded by referring thereto on Step 24.

Finally, the block 1116 is discussed. Since the present block 1116 is entirely outside the object on Step 12, the process is advanced to Step 21, where the previous block 1115 is not entirely outside the object, thus the present block 1116 is padded by referring thereto on Step 24.

When the block 1117 is processed, the present block 1117 is not entirely outside the object on Step 12, thus the block is padded on Step 13. On Step 15, the previous block 116 adjacent to in horizontal direction is entirely outside the object, the previous block is padded on Step 19. In other words, the block 1116 is padded twice. When a plurality of padding values are available, an average of these values are taken, or one of these values can be selected for padding. The picture 108 is thus padded through expanding thereof in the horizontal direction.

Figure 25:
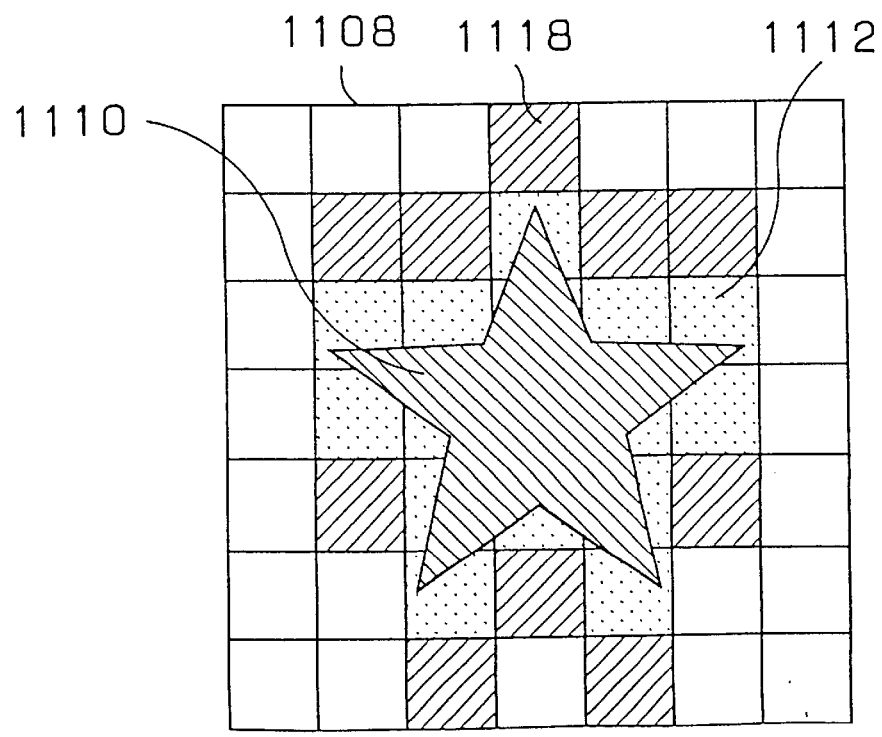
FIG. 25 is a schematic diagram of a second example of the picture padded through the padding method of the digital picture in the $14^{th}$ exemplary embodiment of the present invention.
Figure 26:
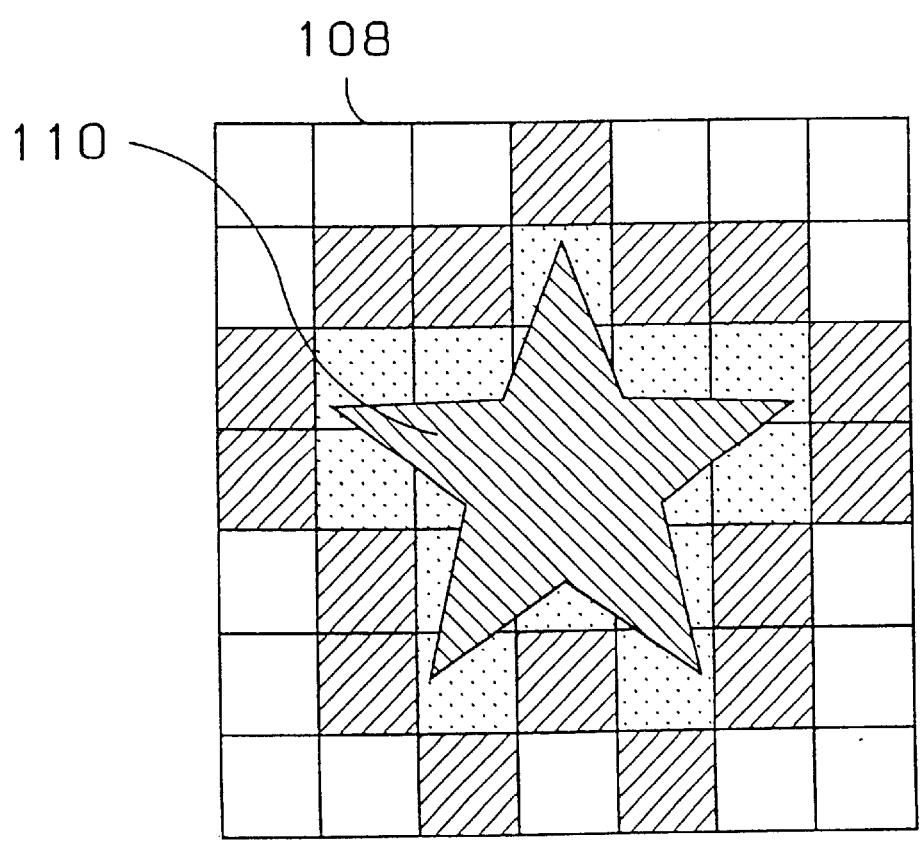
FIG. 26 is a schematic diagram of a third example of the picture padded through the padding method of the digital picture in the $14^{th}$ exemplary embodiment of the present invention.

When the horizontal direction is changed to vertical direction in the processes on Steps 15, 19 and 21, a picture undergone the padding through vertical expansion as shown in FIG. 25 is obtained. When both blocks adjacent to in horizontal and vertical directions are processed in combination, a picture which is padded through extension in both horizontal and vertical directions as shown in FIG. 26 can be obtained. In this case, when a sample is padded twice or more, an average of all the padding values or a part of them are taken. When a plurality of padding candidates are available, the nearest candidate in the process order can be used.

A picture encoder and decoder which employ the padding method according to the present invention is described hereinafter.

(Exemplary Embodiment 15)

Figure 27:
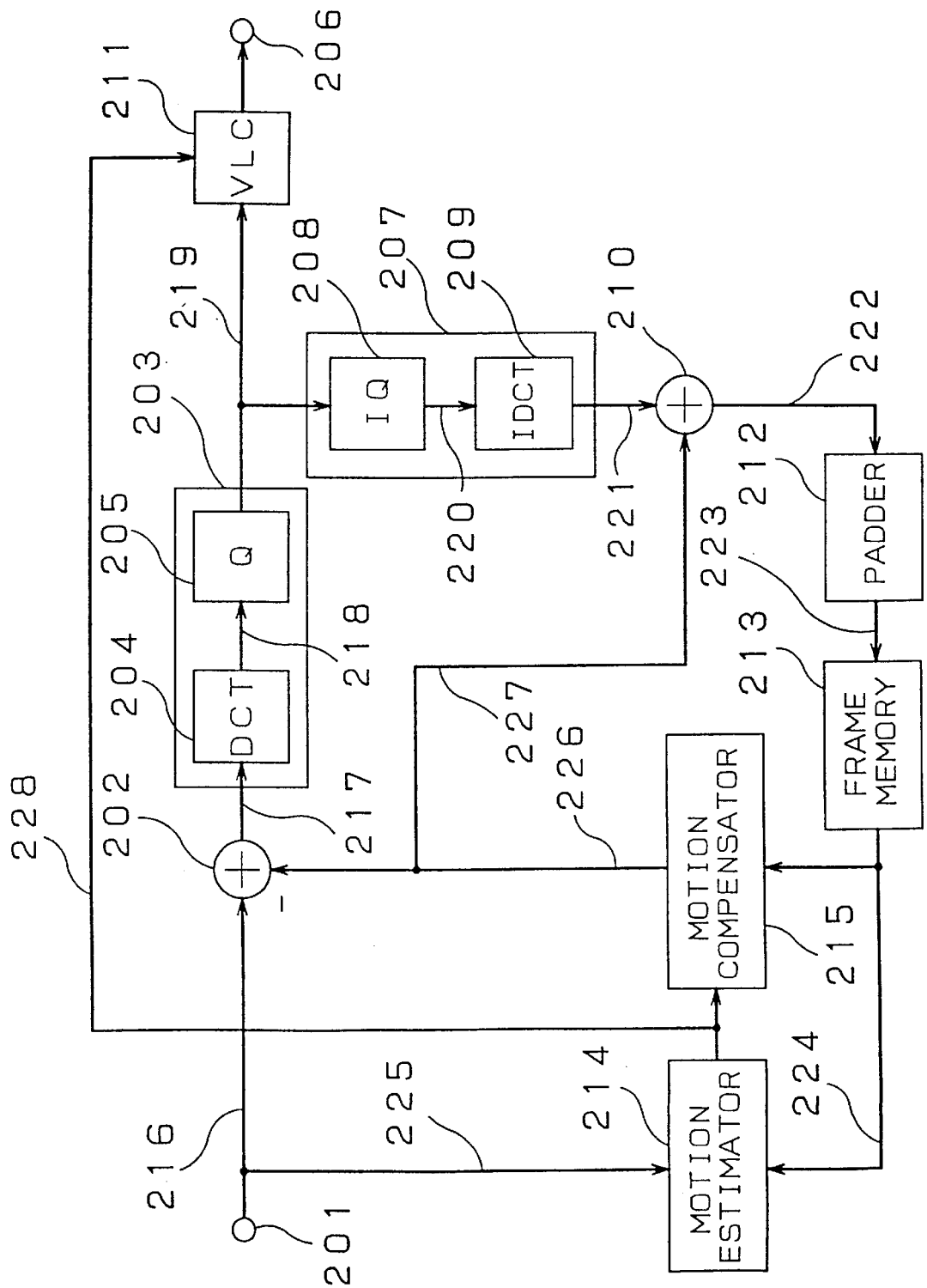
FIG. 27 is a block diagram depicting a digital picture encoder utilized in a $15^{th}$ exemplary embodiment of the present invention.

FIG. 27 depicts a digital picture encoder used in the 15$^{th}$ exemplary embodiment. FIG. 27 lists the following elements: input terminal 201, first adder 202, encoder 203, discrete cosine transformer (DCT) 204, quantizer 205, output terminal 206, decoder 207, inverse quantizer 208, inverse DCT 209, second adder 210, variable length encoder (VLC) 211, padder 212, frame memory 213, motion estimator 214 and motion compensator 215.

An operation of the digital picture encoder comprising the above elements is described hereinafter. First, input a picture having an arbitrary shape into the input terminal 201, then resolve the picture into a plurality of regions adjacent with each other. In this embodiment, the block is resolved in to 8×8 blocks or 16×16 blocks; however, the blocks can be resolved into arbitrary shapes.

FIG. 24 should be referred. Input a subject block of padding into the motion estimator 214 via a line 225. At the same time, input a previously reproduced picture (called "reference picture") stored in the frame memory 213 into the motion estimator.

And then, output a motion displacement information (hereinafter called a motion vector) which gives the prediction signal having the least error with respect to the subject block through the block-matching method or other method.

Send this motion vector to the motion compensator 215, where a predicted block is produced from the reference picture. Send this motion vector also to the VLC 211 via a line 228, where the vector is converted into a variable length code. Then, send the subject block and predicted block to the first adder 202, where a differential block is produced by using the difference therebetween. Next, compress the differential block in the encoder 203. In this embodiment, the differential block is compressed in the DCT 204 and the quantizer 205.

On the other hand, send the compressed data to the decoder 207 and expand it. In this embodiment, inversely quantize the compressed data in the inverse quantizer 208, and then expand thereof into the data in spatial domain in the IDCT 209. Add the predicted block sent via a line 227 to the expanded differential block to produce a reproduced block. Then, input the reproduced block to the padder 212, where insignificant samples of the reproduced block are substituted for padding through the padding method described in the 11$^{th}$ exemplary embodiment. Then, store the padded reproduced block in the frame memory 213. Refer to the shape signal already encoded or decoded when a sample value should be indicated as significant or insignificant (this is not described in the drawings though.)

The padded picture to be stored in the frame memory 213 is, e.g., shown in FIGS. 24, 25 or 26. Send the padded picture via a line 224 to the motion estimator 214 and the motion compensator 215. In this embodiment, an active area of the motion estimator and motion compensator is limited within the padded region (the painted regions in FIGS. 24, 25 and 26), in other words, samples outsides the padded region are not accessed.

Figure 28:
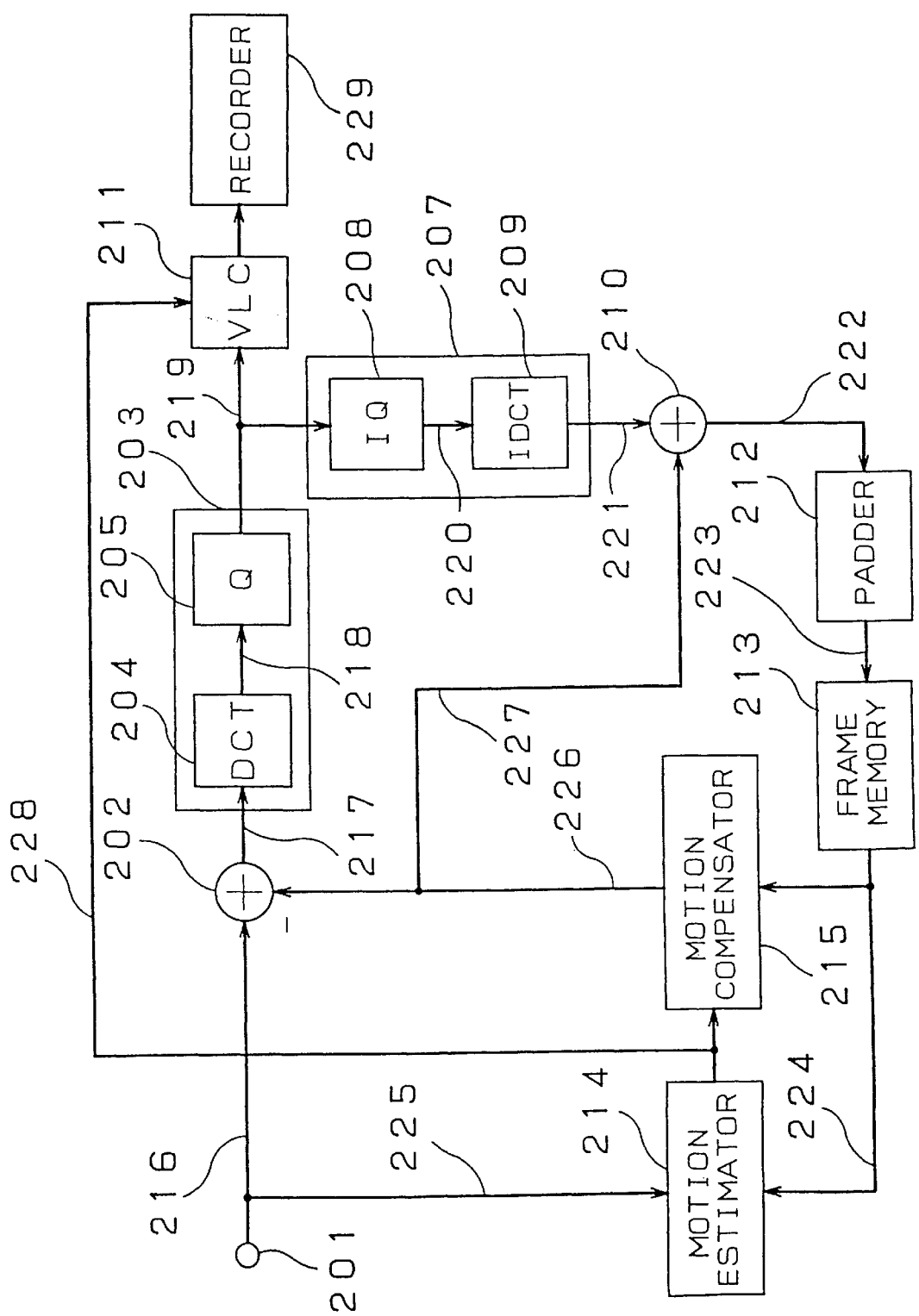
FIG. 28 is a block diagram depicting a modification of the digital picture encoder utilized in the $15^{th}$ exemplary embodiment of the present invention.

FIG. 28 depicts the picture encoder having a recorder 229 coupled to the picture encoder shown in FIG. 27. The data converted to a variable length code by the VLC 211 is stored into a magnetic medium (tape or disc) or an optical disc via the recorder 229.

As such, the region adjacent to the object boundary is padded, whereby the active area of the motion estimation and motion compensation can be enlarged. Thus, the predicted block with less remaining difference can be obtained for the picture having a great motion. Further, the padding method according to the present invention can suppress the delay time and calculation volumes.

The discrete cosine transform is employed in this embodiment; however, the shape adaptive discrete cosine transform, subband, or wavelet can also produce the same effect.

(Exemplary Embodiment 16)

Figure 29:
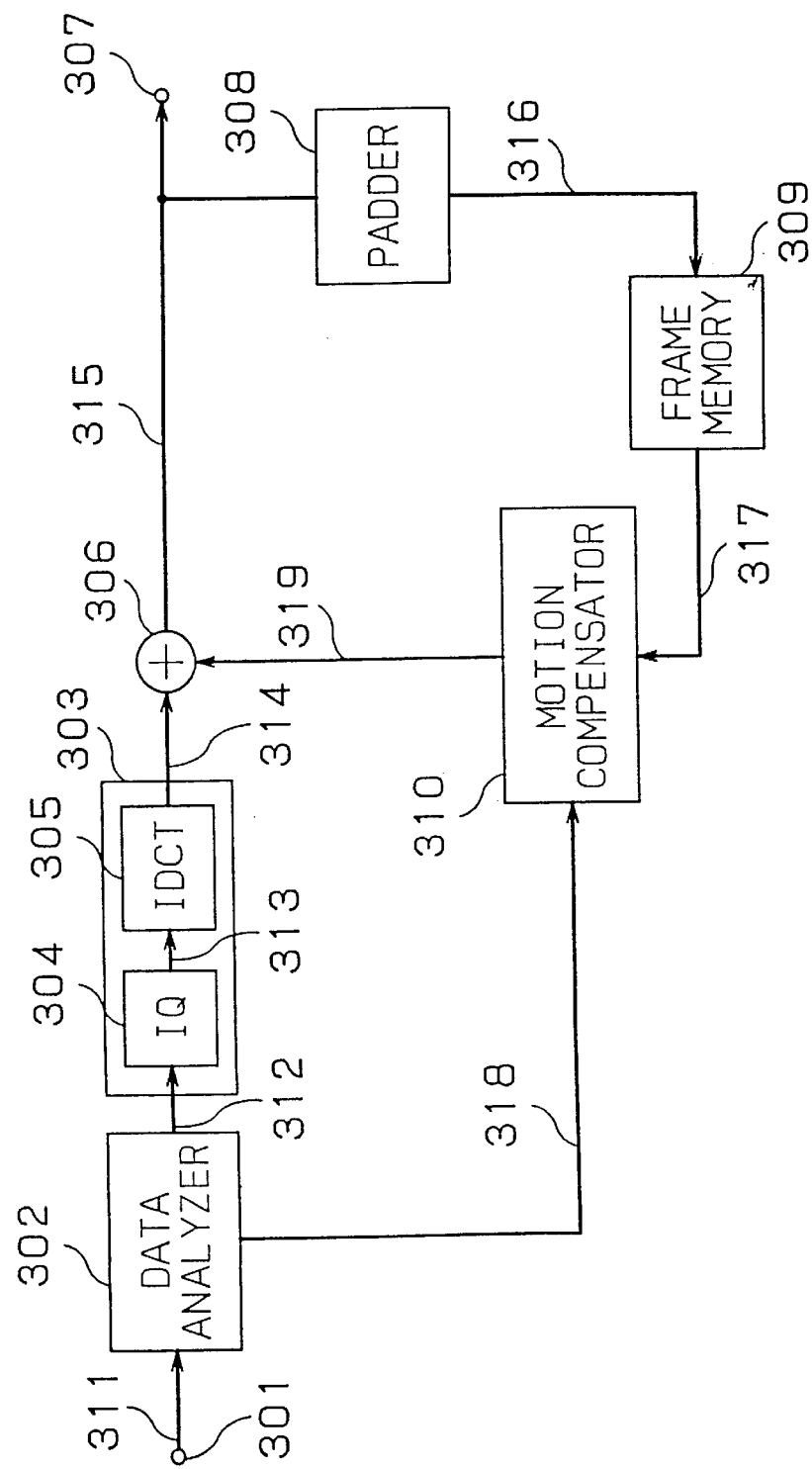
FIG. 29 is a block diagram depicting a digital picture decoder utilized in a $16^{th}$ exemplary embodiment of the present invention.

FIG. 29 depicts a digital picture encoder used in the 16$^{th}$ exemplary embodiment. FIG. 29 lists the following elements: input terminal 301, data analyzer 302, decoder 303, inverse quantizer 304, IDCT (inverse discrete cosine transformer) 305, adder 306, output terminal 307, padder 308, frame memory 309 and padder 310.

An operation of the digital picture decoder comprising the above elements is described hereinafter. First, input a compressed data to the input terminal 301, then analyze the data in the data analyzer 302. Output the data of the compressed differential block to the decoder 303 via a line 312. Next, output a motion vector to the motion compensator 310 via a line 318. In the decoder 303, expand the compressed remaining block and restore it to a expanded differential block. In this embodiment, the compressed differential block undergoes the inverse quantizer 304 and IDCT 305 to be transformed from a signal in frequency domian into a signal in a spatial domain. Then input the motion vector to the motion compensator 310 via a line 318.

In the motion compensator 310, produce an address based on the motion vector in order to access the frame memory 309, and also produce a predicted block using a picture stored in the frame memory 309. Then, input the produced predicted block and the expanded differential block to the adder 306 to produce a reproduced block. Output the reproduced block to the output terminal 307, and at the same time, input thereof to the padder 308. Finally, pad the reproduced block through the padding method detailed in the 11$^{th}$ exemplary embodiment, and store the padded block in the frame memory 309.

(Exemplary Embodiment 17)

Figure 30:
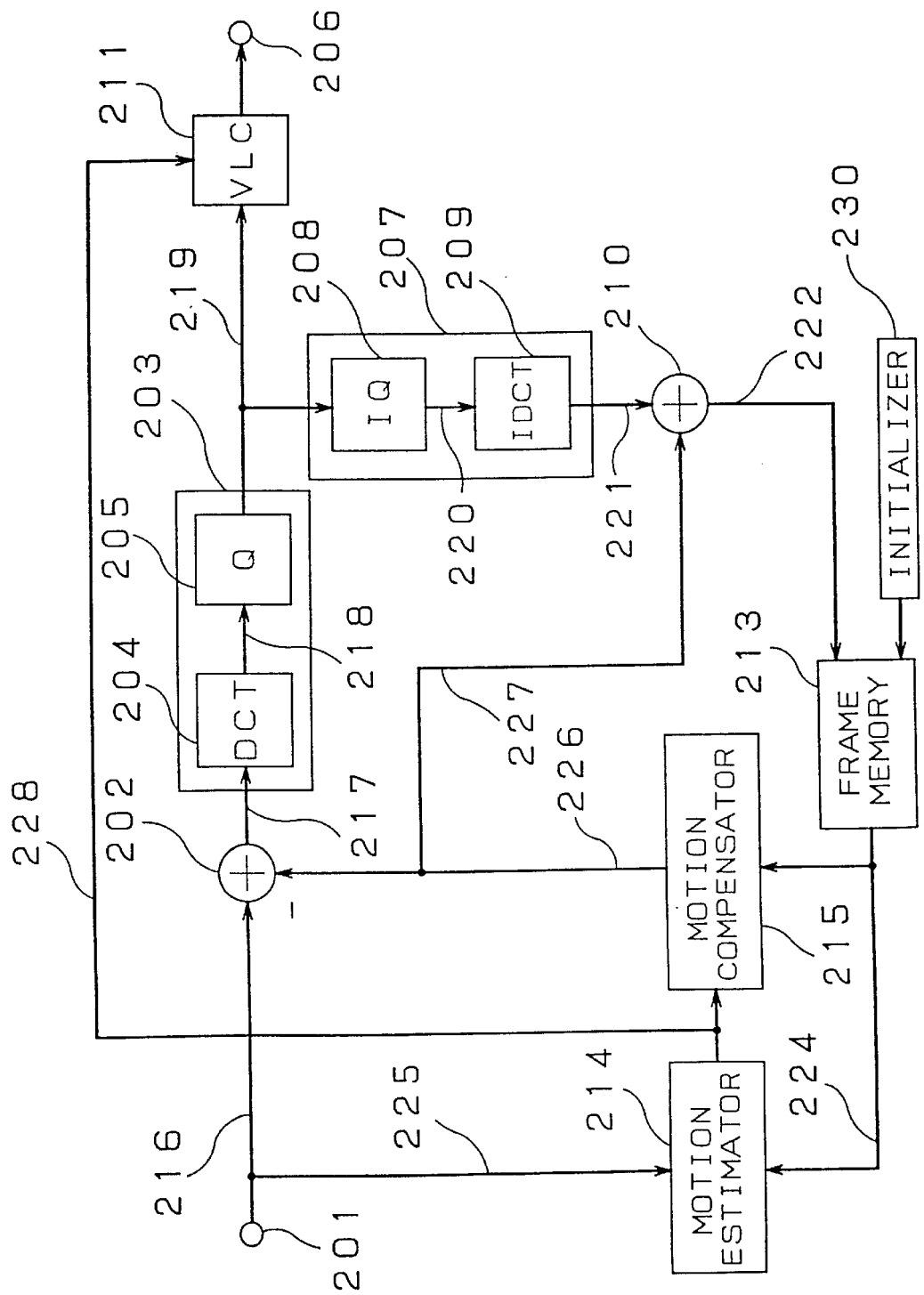
FIG. 30 is a block diagram depicting a digital picture encoder utilized in a 17$^{th}$ exemplary embodiment of the present invention.

FIG. 30 depicts a digital picture encoder used in the 17$^{th}$ exemplary embodiment. The basic structure is the same as shown in FIG. 27. An initializer 230 is used instead of the padder 212. Before a picture is stored in the frame memory 213, the frame memory 213 picture is initialized with a predetermined initialization value by the initializer 230. The reproduced block tapped off from the second padder 210 is stored in the frame memory 213. The initialization value can be a fixed value, or an average value of significant samples of reproduced picture in the past.

Figure 31:
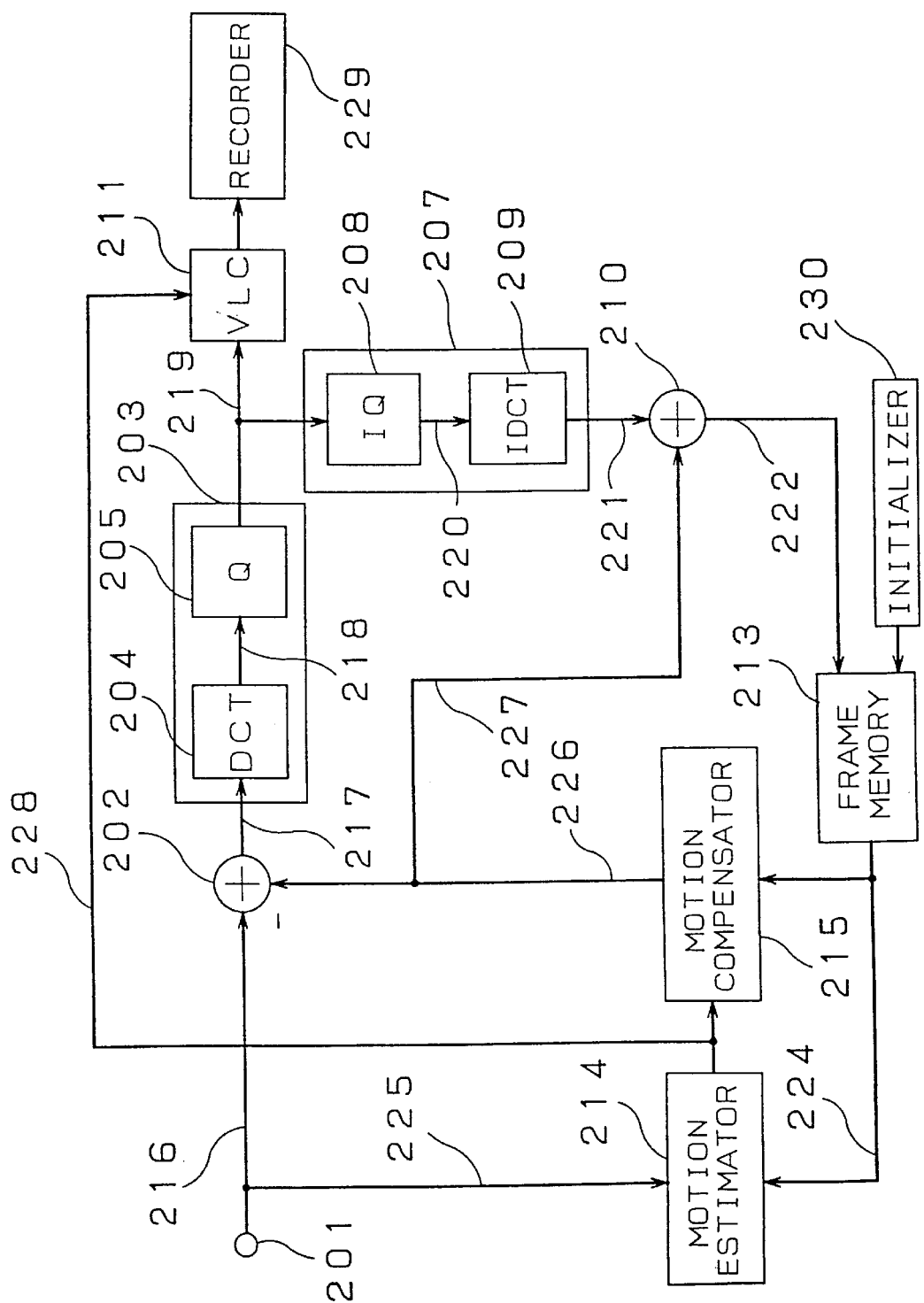
FIG. 31 is a block diagram depicting a digital picture decoder utilized in a 17$^{th}$ exemplary embodiment of the present invention.

FIG. 31 depicts the picture encoder having the recorder 229 coupled to the picture encoder shown in FIG. 30. The data converted to a variable length code by the VLC 211 is stored into a magnetic medium (tape or disc) or an optical disc via the recorder 229.

(Exemplary Embodiment 18)

Figure 32:
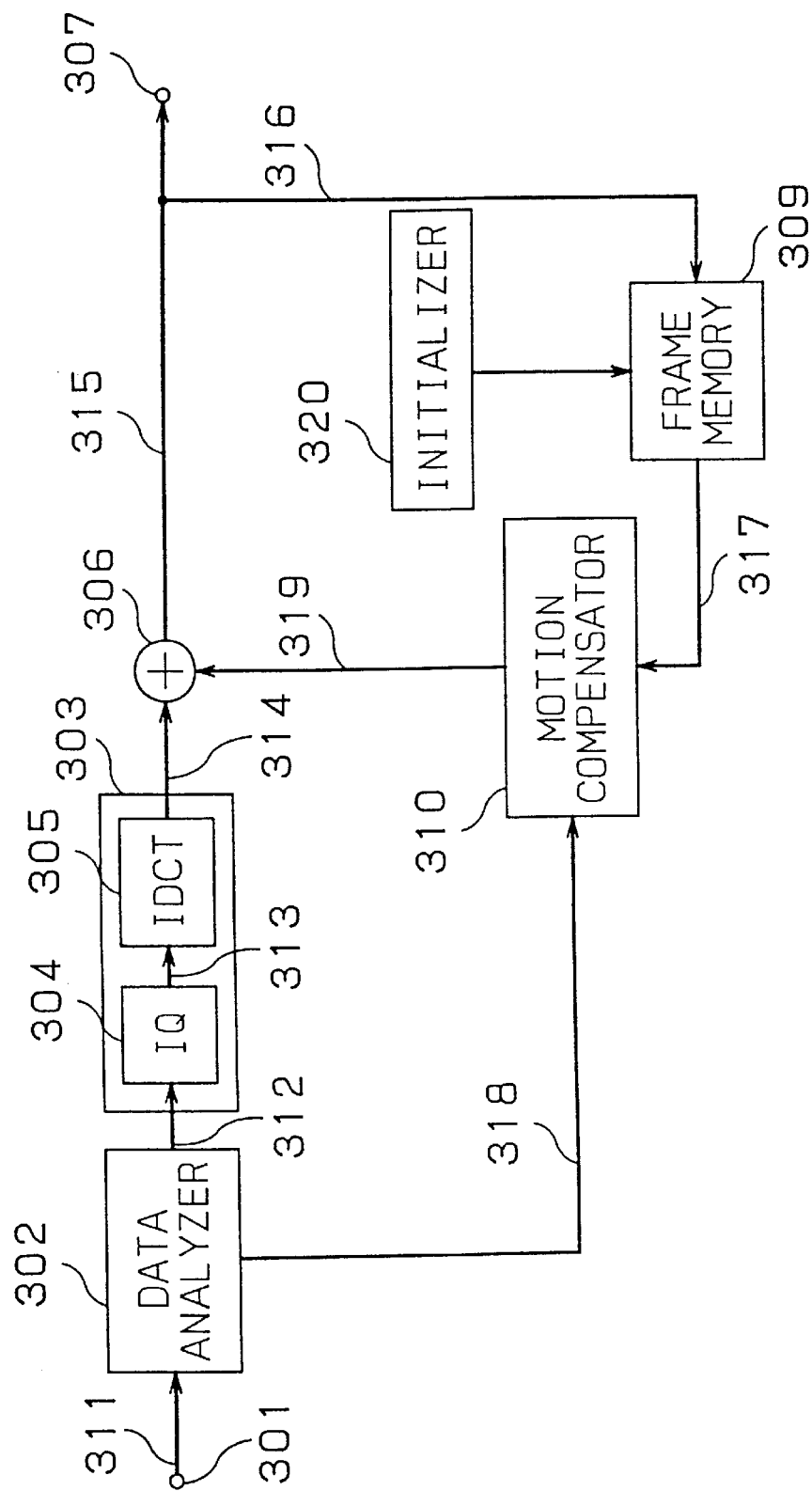
FIG. 32 is a block diagram depicting a digital picture decoder utilized in a 18$^{th}$ exemplary embodiment of the present invention.

FIG. 32 depicts a digital picture decoder used in the 18$^{th}$ exemplary embodiment. It has basically the same structure as that in FIG. 29, and employs an initializer 320 instead of the padder 308. Before a picture is stored in a frame memory 309, the frame memory is initialized with a predetermined initialization value by the initializer 320. The reproduced block tapped off from a padder 306 is stored in the frame memory 309. The initialization value can be a fixed value, or an average value of significant samples of reproduced picture in the past.

INDUSTRIAL APPLICABILITY

The present invention provides a simple padding method, through which a small region undergone a motion compensation or a small reproduced region are padded, whereby calculation volumes can be substantially reduced. Since a subject region of padding is a closed small region, it takes a shorter delay time than when padding is performed across the entire picture. Further, not only a boundary region but also a region adjacent thereto, which comprises insignificant samples only is padded, and a motion is estimated as well as motion is compensated using the padded regions, whereby a predicted signal with less difference can be obtained. These factors contribute to the higher efficiency of encoding/decoding a picture having an arbitrary shape.

What is claimed is:

1. An encoder for encoding an arbitrarily shaped object image on a block base, wherein the arbitrarily shaped object image comprising a shape signal indicating whether a pixel is outside an arbitrarily shaped object (insignificant) or inside the arbitrarily shaped object (significant) and a texture signal indicating a pixel texture value of a pixel inside the arbitrarily shaped object, the encoder comprising:

resolving means for resolving the arbitrarily shaped object image into a plurality of blocks, encoding means for encoding the block to produce a compressed data, decoding means for decoding the compressed data into a reproduced block, padding means for padding a pixel texture value of an insignificant pixel within the reproduced block, wherein the reproduced block padded at the padding means is stored in a frame memory, wherein the padding means comprises a boundary block padding means and a first exterior block padding means, the boundary block padding means pads a pixel texture value of an insignificant pixel within the reproduced block, when the reproduced block is a boundary block lying on an arbitrarily shaped object boundary, using a pixel texture value generated from a pixel texture value of a significant pixel on the arbitrarily shaped object boundary;

and the first exterior block padding means pads a pixel texture value of an insignificant pixel within the reproduced block, when the reproduced block is a first exterior block including no significant pixel, using a pixel texture value at a block boundary of the boundary block, the first exterior block being immediately adjacent to the boundary block, and the pixel texture values of all insignificant pixels within the boundary block having been padded by the boundary block padding means for padding the pixel texture value of the insignificant pixel within the boundary block.

2. An encoder according to claim 1, wherein the boundary block padding means comprises a horizontal repetitive padding means and a vertical repetitive padding means, (1) wherein the horizontal repetitive padding means comprises:

first generating means for generating a horizontal padding value from the pixel texture value of the significant pixel on the arbitrarily shaped object boundary in the same row, first filling means for filling a pixel texture value of an insignificant pixel outside the arbitrarily shaped object with the generated horizontal padding value in a horizontal direction, to produce a horizontal padding block, (2) wherein the vertical repetitive padding means comprises:

second generating means for generating a vertical padding value from the pixel texture value of the significant pixel on the arbitrarily shaped object boundary or the horizontal padding value at the horizontal padding block in the same column, second filling means for filling a pixel texture value of a remaining unfilled pixel that is an insignificant pixel remaining unfilled in the horizontal repetitive padding means with the generated vertical padding value in a vertical direction.

3. An encoder according to claim 2, wherein the horizontal repetitive padding means comprising:

in the case that there are two significant pixels horizontally in the left and right direction on the arbitrarily shaped object boundary, generating the horizontal padding value by averaging two pixel values corresponding to pixel texture values of the two significant pixels, to fill the pixel texture value of the insignificant pixel positioned between the two significant pixels with the horizontal padding value.

4. An encoder according to claim 1, wherein the encoder comprises:

selecting means for selecting a boundary block adjacent to the first exterior block from a plurality of boundary blocks that are blocks lying on the arbitrarily shaped object boundary, filling means for filling the insignificant pixel of the first exterior block with a pixel texture value at a block boundary of the selected boundary block, wherein the pixel texture values of all insignificant pixels within the selected boundary block are padded at the step of padding the pixel texture value of the insignificant pixel within the boundary block, the block boundary of the selected boundary block is adjacent to a block boundary of the first exterior block.

5. An encoder for encoding an arbitrarily shaped object image on a block base, wherein the arbitrarily shaped object image comprising a shape signal indicating whether a pixel is outside an arbitrarily shaped object (insignificant) or inside the arbitrarily shaped object (significant) and a texture signal indicating a pixel texture value of a pixel inside the arbitrarily shaped object, the encoder comprising:

resolving means resolving the arbitrarily shaped object into a plurality of blocks, encoding means compressing the block to produce a compressed data, decoding means restoring the compressed data into a reproduced block, padding means for padding a pixel texture value of an insignificant pixel within the reproduced block, wherein the reproduced block padded at the padding means is stored in a frame memory, wherein the padding means comprises a boundary block padding means, a first exterior block padding means and a second exterior block padding means, the boundary block padding means pads a pixel texture value of an insignificant pixel within the reproduced block, when the reproduced block is a boundary block lying on an arbitrarily shaped object boundary, using a pixel texture value generated from a pixel texture value of a significant pixel on the arbitrarily shaped object boundary, the first exterior block padding means pads a pixel texture value of an insignificant pixel within the reproduced block, when the reproduced block is a first exterior block including no significant pixel, using a pixel texture value at a block boundary of the boundary block, the first exterior block being immediately adjacent to the boundary block, and the pixel texture values of all insignificant pixels within the boundary block having been padded by the boundary block padding means for padding the pixel texture value of the insignificant pixel within the boundary block; and the second exterior block padding means pads all pixel texture values within a second exterior block that is a block including no significant pixel other than the first exterior block, using a predetermined padding texture value.

6. An encoder according to claim 5, wherein the boundary block padding means comprises a horizontal repetitive padding means and a vertical repetitive padding means, (1) wherein the horizontal repetitive padding means comprises:

first generating means for generating a horizontal padding value from the pixel texture value of the significant pixel on the arbitrarily shaped object boundary in the same row, first filling means for filling a pixel texture value of an insignificant pixel outside the arbitrarily shaped object with the generated horizontal padding value in a horizontal direction, to produce a horizontal padding block, (2) wherein the vertical repetitive padding means comprises:

second generating means for generating a vertical padding value from the pixel texture value of the significant pixel on the arbitrarily shaped object boundary or the horizontal padding value at the horizontal padding block in the same column, second filling means for filling a pixel texture value of a remaining unfilled pixel that is an insignificant pixel remaining unfilled in the horizontal repetitive padding means with the generated vertical padding value in a vertical direction.

7. An encoder according to claim 5, wherein the encoder comprises:

selecting means for selecting a boundary block adjacent to the first exterior block from a plurality of boundary blocks that are blocks lying on the arbitrarily shaped object boundary, filling means for filling the insignificant pixel of the first exterior block with a pixel texture value at a block boundary of the selected boundary block, wherein the pixel texture values of all insignificant pixels within the selected boundary block are padded at the step of padding the pixel texture value of the insignificant pixel within the boundary block, the block boundary of the selected boundary block is adjacent to a block boundary of the first exterior block.

* * * * *